United States Patent
Vogel et al.

(10) Patent No.: US 12,417,294 B2
(45) Date of Patent: Sep. 16, 2025

(54) ASYNCHRONOUS PING MESSAGES FOR DETERMINING CAPABILITY OF SYSTEMS FOR EXECUTING ASYNCHRONOUS PROTOCOLS

(71) Applicant: SAP SE, Walldorf (DE)

(72) Inventors: Matthias Vogel, Saarbrücken (DE); Benny Rolle, Reinhardshagen (DE)

(73) Assignee: SAP SE, Walldorf (DE)

( * ) Notice: Subject to any disclaimer, the term of this patent is extended or adjusted under 35 U.S.C. 154(b) by 478 days.

(21) Appl. No.: 18/074,745

(22) Filed: Dec. 5, 2022

(65) Prior Publication Data

US 2024/0184895 A1  Jun. 6, 2024

(51) Int. Cl.
*G06F 21/60* (2013.01)
*H04L 67/10* (2022.01)

(52) U.S. Cl.
CPC .............. *G06F 21/60* (2013.01); *H04L 67/10* (2013.01)

(58) Field of Classification Search
CPC ................................. G06F 21/60; H04L 61/10
See application file for complete search history.

(56) References Cited

U.S. PATENT DOCUMENTS

| | | | |
|---|---|---|---|
| 17,186 A | 5/1857 | Atwater | |
| 17,457 A | 6/1857 | Tidgewell | |
| 7,308,704 B2 | 12/2007 | Vogel et al. | |
| 7,350,237 B2 | 3/2008 | Vogel et al. | |
| 7,685,605 B1 | 3/2010 | Ahmed et al. | |
| 7,831,567 B2 | 11/2010 | Luther et al. | |

(Continued)

FOREIGN PATENT DOCUMENTS

| | | |
|---|---|---|
| CA | 2922139 | 11/2021 |
| CA | 3096061 | 4/2023 |

(Continued)

OTHER PUBLICATIONS

Non-Final Office Action in U.S. Appl. No. 17/702,013, mailed on Jan. 4, 2024, 9 pages.

(Continued)

*Primary Examiner* — Emmanuel L Moise
*Assistant Examiner* — Xiang Yu
(74) *Attorney, Agent, or Firm* — Fish & Richardson P.C.

(57) ABSTRACT

The present disclosure involves systems, software, and computer implemented methods for using asynchronous ping messages for determining capability of systems for executing asynchronous protocols. One example method includes sending a work package to at least one application in a multiple-application landscape to determine capabilities of each application for participating in a data privacy integration protocol. Application responses to the sending of the work package are evaluated to determine capabilities of each application for participating in the protocol. A determination is made regarding whether each application is capable of participating in the protocol. In response to determining that at least one application is not capable of participating in the protocol, at least one corrective action regarding the protocol is performed. In response to determining that each application is capable of participating in the protocol, at least one protocol action is performed for the protocol.

20 Claims, 10 Drawing Sheets

(56) References Cited

U.S. PATENT DOCUMENTS

| | | |
|---|---|---|
| 8,484,351 B1 | 7/2013 | Dean et al. |
| 8,566,193 B2 | 10/2013 | Singh et al. |
| 9,405,429 B1 | 8/2016 | Gopalakrishnan |
| 9,703,813 B2 | 7/2017 | Hegde et al. |
| 9,904,796 B2 | 2/2018 | Pluder et al. |
| 10,387,810 B1 | 8/2019 | Kalush et al. |
| 10,409,790 B2 | 9/2019 | Lehnert et al. |
| 10,430,413 B2 | 10/2019 | Christoph et al. |
| 10,552,642 B2 | 2/2020 | Rolle et al. |
| 10,642,805 B1 | 5/2020 | Masse |
| 10,754,932 B2 | 8/2020 | Wiederspohn et al. |
| 10,776,254 B1* | 9/2020 | Dhayanithi ......... G06F 11/3698 |
| 10,812,608 B1 | 10/2020 | Thummala Abbigari et al. |
| 10,839,099 B2 | 11/2020 | Vogel et al. |
| 10,909,222 B1 | 2/2021 | Fregly et al. |
| 11,042,654 B2 | 6/2021 | Nos et al. |
| 11,113,417 B2 | 9/2021 | Rolle |
| 11,200,331 B1 | 12/2021 | Bouaichi et al. |
| 11,615,059 B2 | 3/2023 | Kottomtharayil et al. |
| 11,630,673 B2 | 4/2023 | Grant |
| 11,675,651 B2 | 6/2023 | Li et al. |
| 11,720,367 B2 | 8/2023 | Wallach |
| 11,765,045 B1 | 9/2023 | Nguyen et al. |
| 11,899,655 B2 | 2/2024 | Malik et al. |
| 11,921,905 B2 | 3/2024 | Savagaonkar et al. |
| 11,941,151 B2 | 3/2024 | Mendoza et al. |
| 11,947,662 B2 | 4/2024 | Gingell et al. |
| 11,962,576 B2 | 4/2024 | Sapek et al. |
| 11,994,966 B2 | 5/2024 | Anthonappa et al. |
| 12,045,242 B2 | 7/2024 | Srivastava et al. |
| 12,056,255 B1 | 8/2024 | Mystetskyi et al. |
| 12,141,302 B2 | 11/2024 | Rolle et al. |
| 12,147,567 B2 | 11/2024 | Rolle et al. |
| 12,164,470 B2 | 12/2024 | Rolle et al. |
| 12,184,656 B2 | 12/2024 | Rolle et al. |
| 12,189,813 B2 | 1/2025 | Rolle et al. |
| 12,210,897 B2 | 1/2025 | Rolle et al. |
| 2004/0187047 A1 | 9/2004 | Rathunde et al. |
| 2007/0089117 A1 | 4/2007 | Samson |
| 2008/0060051 A1 | 3/2008 | Lim |
| 2008/0091807 A1 | 4/2008 | Strub et al. |
| 2008/0174425 A1 | 7/2008 | Torning |
| 2008/0244016 A1 | 10/2008 | Parthasarathy et al. |
| 2008/0301175 A1 | 12/2008 | Applebaum et al. |
| 2008/0312982 A1 | 12/2008 | Braun et al. |
| 2009/0210394 A1 | 8/2009 | Saravanan et al. |
| 2009/0228340 A1 | 9/2009 | Bohannon |
| 2012/0036507 A1 | 2/2012 | Jonnala et al. |
| 2012/0221444 A1 | 8/2012 | Bowes et al. |
| 2013/0066977 A1 | 3/2013 | Katti et al. |
| 2013/0132696 A1 | 5/2013 | Tomida et al. |
| 2013/0347064 A1 | 12/2013 | Aissi |
| 2014/0032600 A1 | 1/2014 | Sarferaz et al. |
| 2014/0059458 A1 | 2/2014 | Levien et al. |
| 2014/0109238 A1 | 4/2014 | Ravindran |
| 2014/0188572 A1 | 7/2014 | Hegde et al. |
| 2014/0267770 A1 | 9/2014 | Gervautz et al. |
| 2015/0242531 A1 | 8/2015 | Rodniansky |
| 2016/0148143 A1 | 5/2016 | Anderson et al. |
| 2016/0292455 A1 | 10/2016 | Jebara |
| 2017/0006135 A1 | 1/2017 | Siebel et al. |
| 2017/0091479 A1* | 3/2017 | Pluder ................. G06F 21/6245 |
| 2018/0101164 A1 | 4/2018 | Noetzelmann et al. |
| 2018/0322279 A1 | 11/2018 | Beskorovajnov et al. |
| 2019/0018985 A1* | 1/2019 | Rolle ..................... G06F 21/71 |
| 2019/0132276 A1 | 5/2019 | Scheiber et al. |
| 2019/0156445 A1 | 5/2019 | Markham et al. |
| 2019/0236294 A1 | 8/2019 | McDonald et al. |
| 2019/0236334 A1 | 8/2019 | Babushkin |
| 2020/0019728 A1 | 1/2020 | Rolle |
| 2020/0133554 A1 | 4/2020 | Kishi et al. |
| 2020/0167699 A1 | 5/2020 | Cohen |
| 2020/0285766 A1 | 9/2020 | Jois et al. |
| 2020/0293356 A1 | 9/2020 | Bonaud et al. |
| 2020/0380810 A1 | 12/2020 | Unagami et al. |
| 2021/0089678 A1 | 3/2021 | Gkoulalas-Divanis et al. |
| 2021/0192052 A1 | 6/2021 | Loch et al. |
| 2021/0209251 A1 | 7/2021 | Parthasarathy |
| 2022/0043917 A1 | 2/2022 | Rolle |
| 2022/0050834 A1* | 2/2022 | Rolle .................. G06F 16/2425 |
| 2022/0050920 A1 | 2/2022 | Rolle |
| 2022/0058333 A1 | 2/2022 | Rolle |
| 2022/0083513 A1 | 3/2022 | Wong et al. |
| 2022/0100755 A1 | 3/2022 | Rolle |
| 2022/0207429 A1 | 6/2022 | Haribhakti et al. |
| 2022/0277023 A1 | 9/2022 | Rolle et al. |
| 2022/0300837 A1 | 9/2022 | Shmelkin et al. |
| 2022/0309052 A1 | 9/2022 | Rolle |
| 2022/0321566 A1 | 10/2022 | Coyle et al. |
| 2023/0081785 A1 | 3/2023 | Zhang |
| 2023/0111687 A1 | 4/2023 | Mclean et al. |
| 2023/0237192 A1 | 7/2023 | Kahan et al. |
| 2023/0244637 A1 | 8/2023 | Wu |
| 2023/0379276 A1 | 11/2023 | Roy et al. |
| 2024/0005037 A1 | 1/2024 | Chintalapati et al. |
| 2024/0346167 A1 | 10/2024 | Vogel et al. |
| 2024/0370582 A1 | 11/2024 | Rolle et al. |
| 2025/0117245 A1 | 4/2025 | Rolle et al. |

FOREIGN PATENT DOCUMENTS

| | | |
|---|---|---|
| CN | 108664805 | 10/2018 |
| CN | 112818372 | 5/2021 |
| CN | 113095348 | 7/2021 |
| CN | 113282864 | 8/2021 |
| CN | 114092253 | 2/2022 |
| CN | 115809259 | 3/2023 |
| CN | 116522389 | 8/2023 |
| EP | 1662355 | 5/2006 |
| EP | 3575983 | 12/2019 |
| GB | 2316509 | 2/1998 |
| KR | 10-2006-0004909 | 1/2006 |
| RU | 2459379 | 8/2012 |
| WO | WO 2012061433 | 5/2012 |
| WO | WO 2018170504 | 9/2018 |
| WO | WO 2018131031 | 7/2019 |
| WO | WO 2022211899 | 10/2022 |

OTHER PUBLICATIONS

Non-Final Office Action in U.S. Appl. No. 17/457,811, mailed on Dec. 20, 2023, 27 pages.

Inquaero.com [online], "Fulfill GDPR ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.

SAP "SAP Asset Manager Security Guide" Dec. 10, 2020, 28 pages.

SAP "SAP Event Stream Processor: Security Guide" Sep. 23, 2019, 58 pages.

U.S. Appl. No. 18/077,476, filed Dec. 8, 2022, Rolle et al.
U.S. Appl. No. 18/077,493, filed Dec. 8, 2022, Rolle et al.
U.S. Appl. No. 17/186,934, filed Feb. 26, 2021, Rolle et al.
U.S. Appl. No. 17/457,797, filed Dec. 6, 2021, Ighoroje et al.
U.S. Appl. No. 17/457,802, filed Dec. 6, 2021, Rolle et al.
U.S. Appl. No. 17/457,811, filed Dec. 6, 2021, Rolle et al.
U.S. Appl. No. 17/457,816, filed Dec. 6, 2021, Vogel et al.
U.S. Appl. No. 17/457,824, filed Dec. 6, 2021, Vogel et al.
U.S. Appl. No. 17/457,827, filed Dec. 6, 2021, Ighoroje et al.
U.S. Appl. No. 17/680,717, filed Feb. 25, 2022, Rolle et al.
U.S. Appl. No. 17/680,741, filed Feb. 25, 2022, Rolle et al.
U.S. Appl. No. 17/680,759, filed Feb. 25, 2022, Rolle et al.
U.S. Appl. No. 17/680,858, filed Feb. 25, 2022, Rolle.
U.S. Appl. No. 17/702,013, filed Mar. 23, 2022, Rolle.
U.S. Appl. No. 17/718,770, filed Apr. 12, 2022, Rolle.
U.S. Appl. No. 18/049,063, filed Oct. 24, 2022, Hesse et al.
U.S. Appl. No. 18/073,164, filed Dec. 1, 2022, Rolle et al.

Wikipedia.org [online], "Hyperscale computing" created on May 2013, retrieved on Dec. 1, 2022, retrieved from URL <https://en.wikipedia.org/wiki/Hyperscale_computing>, 2 pages.

(56) References Cited

OTHER PUBLICATIONS

Wikipedia.org [online], "Information privacy" created on May 2003, retrieved on Dec. 6, 2021, retrieved from URL <https://en.wikipedia.org/wiki/Information_privacy>, 7 pages.
Wikipedia.org [online], "Master Data" created on Oct. 2006, retrieved on Dec. 6, 2021, retrieved from URL <https://en.wikipedia.org/wiki/Master_data>, 2 pages.
Wikipedia.org [online], "Personal Data" created on May 2005, retrieved on Dec. 6, 2021, retrieved from URL <https://en.wikipedia.org/wiki/Personal data>, 7 pages.
Wikipedia.org [online], "Personal Identifier" created on Feb. 2007, retrieved on Dec. 1, 2022, retrieved from URL <https://en.wikipedia.org/wiki/Personal_identifier>, 3 pages.
Barreto et al., "An Efficient and Fault-Tolerant Update Commitment Protocol for Weakly Connected Replicas" INESC-ID/IST, Sep. 2005, 1059-1068.
Final Office Action in U.S. Appl. No. 18/077,493, mailed on Mar. 4, 2025, 31 pages.
Non-Final Office Action in U.S. Appl. No. 18/077,493, mailed on Nov. 5, 2024, 30 pages.
Non-Final Office Action in U.S. Appl. No. 18/751,559, mailed on Mar. 25, 2025, 16 pages.

\* cited by examiner

ASYNCHRONOUS PING MESSAGES FOR DETERMINING CAPABILITY OF SYSTEMS FOR EXECUTING ASYNCHRONOUS PROTOCOLS

TECHNICAL FIELD

The present disclosure relates to computer-implemented methods, software, and systems for using asynchronous ping messages for determining capability of systems for executing asynchronous protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for using asynchronous ping messages for determining capability of systems for executing asynchronous protocols. An example method includes: determining to send a work package to at least one application in a multiple-application landscape to determine capabilities of each application for participating in a data privacy integration protocol; sending the work package to each application of the at least one application; receiving application responses to the sending of the work package; evaluating the application responses to the work package to determine capabilities of each application for participating in the data privacy integration protocol; determining, based on the evaluation, whether each application of the at least one application is capable of participating in the data privacy integration protocol; in response to determining that at least one application is not capable of participating in the data privacy integration protocol, performing at least one corrective action regarding the data privacy integration protocol; and in response to determining that each application of the at least one application is capable of participating in the data privacy integration protocol, performing at least one protocol action for the data privacy integration protocol.

Implementations can include one or more of the following features. The data privacy integration protocol can be an integrated end of purpose protocol, an aligned purpose disassociation protocol, or an integrated personal data retrieval protocol. Determining to send the work package can include determining to send the work package based on a periodic schedule or receiving a command from an administrator. Determining to send the work package to the at least one application can include determining that each application of the at least one application has not participated in the data privacy integration protocol for at least a threshold period of time. Determining to send the work package to the at least one application can include: receiving a request for the data privacy integration protocol; determining that each application of the at least one application is relevant to the request; and determining to send the work package to the at least one application to determine capabilities of each application before processing the request. The work package can be an asynchronous ping work package that is of a different work package type than protocol-specific work packages that are specific to the data privacy integration protocol. The work package can be a protocol-specific work package that includes zero objects. An application response can include status information for processing the protocol-specific work package that includes zero objects. Each application response can correspond to an invocation of a data privacy integration service application programming interface. An application response can include configuration information that indicates how an application is configured for the data privacy integration protocol. Evaluating application responses can include determining that received configuration information for a first application does not match expected configuration information for the first application. Evaluating application responses can include measuring application response times for responding to the work package. Evaluating application responses can include determining that a first application has not responded to the work package within a predetermined period of time. Performing at least one protocol action can include continuing to process existing tickets or accepting new tickets for the multiple-application landscape for the data privacy integration protocol. Performing at least one corrective action can include alerting an administrator regarding not all applications being capable of participating in the data privacy integration protocol. Performing at least one corrective action can include cancelling existing requests or rejecting new requests for the multiple-application landscape for the data privacy integration protocol.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
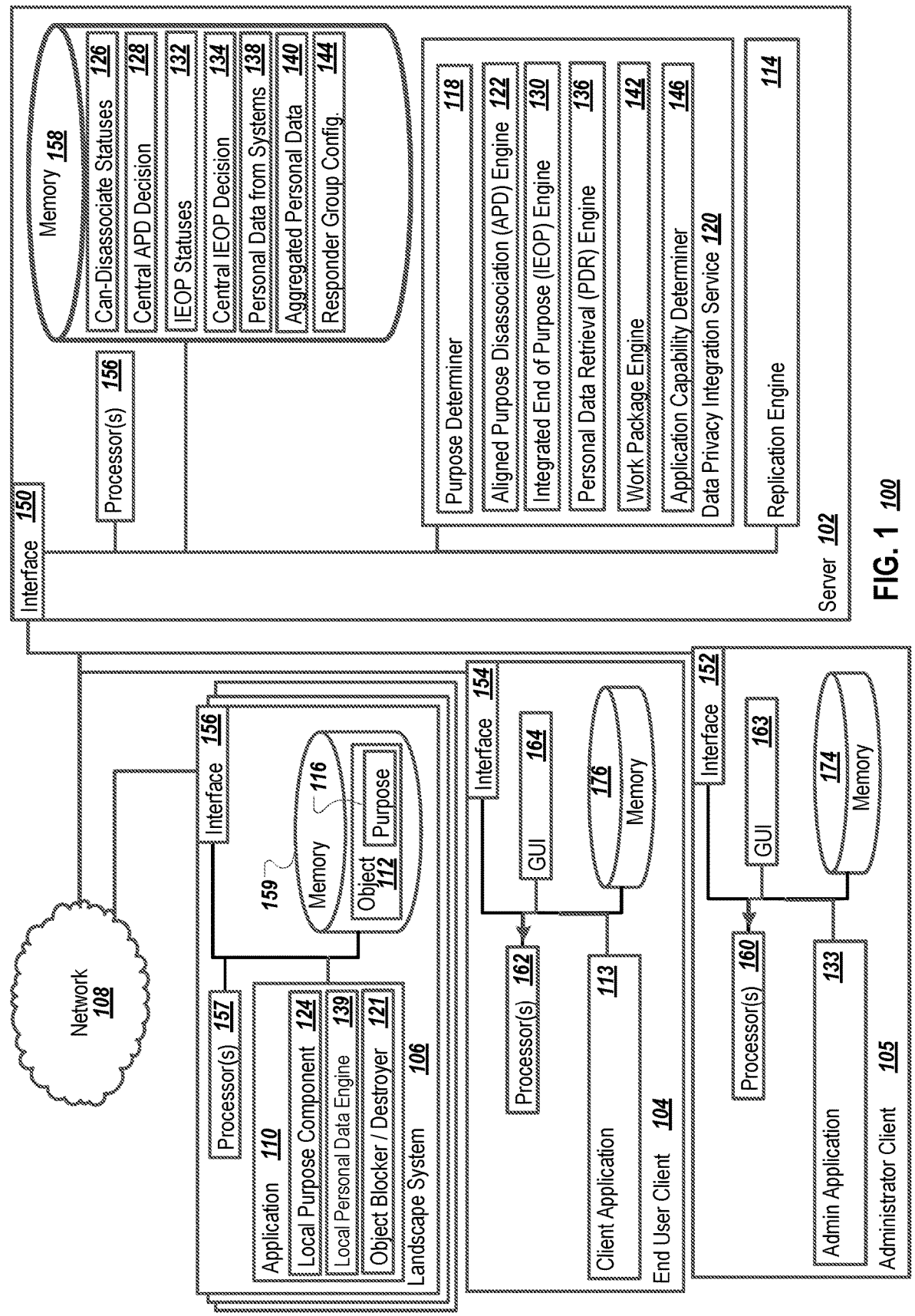
FIG. 1 is a block diagram illustrating an example system for using asynchronous ping messages for determining capability of systems for executing asynchronous protocols.

An integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol can be used to aligned different applications on a point in time when personal data should be blocked. An integrated personal data retrieval protocol can be used to manage receiving exports of personal data from various applications, so that a common report including personal data concerning a same data subject from multiple applications can be generated. An aligned purpose disassociation protocol can be used to align various applications on when a purpose assignment is removed from a data object. The various DPI protocols can be used on-premise and/or in cloud environments, and can be designed as asynchronous protocols using asynchronous communication between the DPI service and the various applications.

The integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Applications may expend a non-trivial amount of resources responding to requests from the DPI service. Different approaches can be used to reduce resource consumption. For example, applications can be grouped into what can be referred to as responder groups, where the DPI service asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block application in earlier responder groups, or putting applications that are likely to expend more resources responding to a request in a later responder group. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

Although responder groups can result in more efficient resource utilization for DPI protocols, other situations or scenarios can lead to inefficient resource use. For example, if an application (e.g., even one in a later responder group) is offline or is not configured correctly, DPI protocol processing by other applications may be wasted since the application may not be able to successfully respond to a DPI request. For example, in some DPI protocols such as integrated end-of-purpose or aligned purpose disassociation, all applications that are relevant for a current phase have to respond affirmatively (e.g., can-block, can-disassociate-purpose) for the DPI service to instruct all relevant applications to perform an action (e.g., block-object, disassociate-purpose-from-object), respectively. An application that is down or misconfigured may not be able to provide feedback (e.g., respond with an affirmative vote), so a successful completion of the DPI phase consensus vote is not possible during a time period the application is down or misconfigured, so resources used by other applications in response to the request are needlessly consumed in this example.

As a particular example, with the integrated end-of-purpose protocol, assume a landscape has fifteen applications that are relevant for an end-of-purpose check. Suppose one application is misconfigured (e.g., after installation of an update), temporarily offline, or otherwise not available. The integrated end-of-purpose protocol can be initiated for a set of 100 objects, for example. The fourteen applications other than the unavailable application may expend effort determining, locally, whether each of the 100 objects can be blocked. So a total effort may be expended of 14 applications times an effort of 100 end-of-purpose checks for the 100 objects. However, due to the unavailability of the one application, none of the 100 objects can be blocked, because not all applications in the landscape (that are configured as relevant for the check) provided a local status. Accordingly, resource use of resources expended by the other 14 applications for local checks may be inefficient. Although the DPI service may be able to use some feedback from applications (e.g., an application may respond with a time indication of when the application may be able to block an object), in general, the applications will have to re-expend resources at a later time in a later run of the protocol phase.

Resource-wasting or inefficient use of resources can have different types of undesired effects. For example, resource costs may be incurred or increased, such as electricity, network bandwidth, machine wear, or monetary cost for third party data center or storage services, to name a few examples. Additionally, unnecessarily responding to DPI requests may be time consuming and occupy application or system resources such that systems are blocked or slowed for performing other operations while DPI requests are being handled.

To reduce a likelihood of unnecessary resource consumption for DPI or other asynchronous protocols, the DPI service can employ different asynchronous techniques to determine an availability and/or configuration state of the applications in the landscape to determine whether a protocol can currently be successfully executed (e.g., whether all applications can successfully respond to asynchronous work packages sent by the DPI service). For example, a new work package type can be introduced for DPI protocols that can be sent to applications to check application response time and application-configuration information included in a response to the work package. As another example, the DPI service can be configured to send a work package of an existing work package type (e.g., check, stop check, start check, block, stop block, unblock, redistribute) with an empty task or object list (e.g., an "empty" work package). Even though the empty work package may be sent with an empty task or object list, the DPI service can expect to still receive a response from correctly-configured and available applications. For example, if the DPI service sends an empty work package as a request to block zero objects, applications can be configured to respond with a response that includes information indicating for example, that no objects were blocked and no objects failed blocking. The DPI service can evaluate responses to the new work package type and/or responses to the empty existing work package types, to determine whether a landscape is in a current state in which successful completion of the DPI protocol is likely. If the DPI service determines that the applications in the landscape are available and correctly configured, the DPI service can determine to handle DPI requests and send work packages to landscape applications. If the DPI service determines that one or more landscape applications are not available and/or configured incorrectly, the DPI service can alert an administrator and put on hold any DPI requests until a later determination is made concerning availability of all landscape applications.

Accordingly, the DPI service can check, in a production landscape, whether applications in the production landscape are currently available and configured correctly for DPI protocols. In comparison, performing tests in a test environment may not reveal a real-time production environment issue. For example, configuration(s) in a production landscape might vary from configuration(s) in a test landscape. Additionally, a number and type of applications in a test landscape (e.g., in general or as a set of responders for a given request) may not match the production landscape. For instance, some applications or systems may not have a corresponding test version or test tenant, for example. Additionally, potential production errors such as an administrator forgetting to schedule a job after installing an update within an application may not be considered or caught by tests performed in a test environment. The use of the new work package or existing empty work packages can not only determine if an application is online (like a traditional ping message) but also determine if applications can successfully respond to protocol work packages.

Accordingly, the work package approach used herein can therefore simulate or verify protocol processing operations in application responders, with little overhead. The asynchronous work pack approach can provide a solution by which a DPI service (and/or an administrator) can determine in a production landscape, by expending a relatively small amount of resources, whether all responders are set up properly and can successfully participate in a DPI protocol, before resource-intensive tickets are executed which may result in significant resource consumption. Additionally, a number of failed protocol runs can be reduced, by avoiding protocol runs that would fail due to application unavailability or misconfiguration. Reducing failed protocol runs can not only reduce resource consumption and costs, but can also increase customer satisfaction due to the customer experiencing a higher number of successful protocol runs.

FIG. 1 is a block diagram illustrating an example system 100 for integrated data privacy services. Specifically, the illustrated system 100 includes or is communicably coupled with a server 102, an end-user client device 104, an administrator client device 105, landscape systems 106, and a network 108. Although shown separately, in some implementations, functionality of two or more systems or servers may be provided by a single system or server. In some implementations, the functionality of one illustrated system, server, or component may be provided by multiple systems, servers, or components, respectively. For example, the server 102 includes different engines which may or may not be provided by a single system or server.

The landscape systems 106 can include multiple systems that exist in a multi-system landscape. An organization can use different systems, of different types, to run the organization, for example. The landscape systems 106 can include systems from a same vendor or different vendors. The landscape systems 106 can each include at least one application 110 for performing organizational processes and working with organizational data. Organizational data can include master data objects and transactional objects. For example, the application 110 can process a master data object 112. An end user can use a client application 113 (which may be a client version of the application 110) on the end-user client device 104 to view and interact with landscape data, including information from the master data object 112. Regarding the handling of master data objects, various best practices can be applied by an organization. For example, the system 100 can be configured so that corresponding master data objects are consistent across all landscape systems 106. For instance, a replication engine 114 can distribute master data across the landscape systems 106 so that each application 110 can perform processing on the same consistent master data.

Various data protection rules and laws may require that data is only processed for legitimate specified purposes. The system 100 can implement a purpose requirement by associating purpose information with each object instance. For example, a purpose 116 has been associated with the master data object 112. A purpose determiner 118 included in a DPI service 120 can determine appropriate purposes for an object and associate the purposes with the object. The landscape system 106 can receive the master data object 112 and the associated purpose 116 from the replication engine 114, for example. The purpose determiner 118 can also determine which applications process objects for which purposes. The replication engine 114 can replicate an object with an assigned purpose to a given landscape system 106 when the landscape system 106 processes objects for that purpose.

Objects that no longer have any associated purposes can be put into a blocked state for a period of time, for instance by an object blocker/destroyer 121, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object.

As part of an aligned disassociation approach, the landscape systems 106 can disassociate a purpose with an object in response to information received from an aligned purpose disassociation engine 122 of the DPI service 120, rather than solely based on a local decision. For example, each landscape system 106 can provide information to the aligned purpose disassociation engine 122. For example, a local purpose component 124 in each landscape system 106 can determine locally (e.g., without consulting other systems), for each purpose of an object, whether the purpose can be locally disassociated from the object. For example, each landscape system 106 can determine a "can-disassociate" status for a requested purpose and object. A can-disassociate status for a respective landscape system 106 can be either an affirmative can-disassociate status that indicates that the landscape system 106 can disassociate a purpose from an object or a negative can-disassociate status that indicates that the landscape system 106 cannot disassociate the purpose from the object. The aligned purpose disassociation engine 122 can collect received can-disassociate statuses 126. The aligned purpose disassociation engine 122 can evaluate the can-disassociate statuses 126 to determine a central aligned disassociate purpose decision 128 regarding disassociating a purpose from an object. The aligned purpose disassociation engine 122 can determine that the central aligned disassociate purpose decision 128 is to disassociate the purpose from the object if no landscape system 106 is unable to disassociate the purpose from the object. The aligned purpose disassociation engine 122 can determine that the central aligned disassociate purpose decision 128 is to not disassociate the purpose from the object if at least one landscape system 106 is unable to disassociate the purpose from the object. The aligned purpose disassociation engine 122 can provide the central aligned disassociate purpose decision 128 to each landscape system 106. The local purpose component 124 can disassociate the purpose from the object in response to receiving the central aligned disassociate purpose decision 128, if the central aligned disassociate purpose decision 128 is in fact to disassociate the purpose from the object.

The object blocker/destroyer 121 can block an object (e.g., from all production processing) when no purposes are associated with the object (e.g., after all purposes have been disassociated), according to one or more retention policies. An object can be blocked, rather than destroyed, if one or more retention policies state that the object is to be maintained for access, outside of productive processing, only by authorized users. The object blocker/destroyer 121 can determine to destroy a blocked object in response to determining that all applicable retention reasons have expired. Object destruction decisions and actions can occur locally and independently in each landscape system 106. For example, each application 110 can determine locally whether a blocked object is to be destroyed. For instance, the application 110 can determine to destroy an object when no purposes are associated with the object, no transactional data references the object, and no retention policy currently applies to the object. In response to an object destruction decision, the object blocker/destroyer 121 can destroy the object.

In some implementations, an iEoP (Integrated End of Purpose) engine 130 of the DPI service 120 is used instead of or in addition to the APD engine 122. The iEoP engine 130 can send EoP queries to each landscape system 106 and receive EoP statuses 132 from the local purpose components 124 of different landscape systems regarding ability to delete a particular master data object. The iEoP engine 130 can evaluate the EoP statuses 132 to generate a central EOP decision 134. If a consensus is reached regarding ability to block an object, the iEoP engine 130 can distribute aligned block commands to trigger an aligned blocking of the object across the landscape systems 106. The iEoP engine 130 can also orchestrate integrated unblocking, when unblocking is required due to blocking failure in one or more systems, or for other reasons.

As mentioned, a data subject can have a right to request personal data stored about the data subject. The data subject can initiate a personal data request from any of the landscape systems 106. For example, the data subject may submit a request using a user interface of the client application 113, with the request being received by the application 110 that handles requests from the client application 113. The application 110 can forward the request to a personal data retrieval engine 136 of the DPI service 120. Accordingly, any application within the landscape that is integrated with the DPI service 120 can request a report that, when generated, includes personal data automatically obtained by the DPI service from all of the other applications in the landscape. The data subject, therefore, can trigger a personal data request, in any one of the applications, rather than having to request from all of the applications. The PDR engine 136 automatically requests and receives personal data 138 from respective local personal data engines 139 in different landscape systems 106. The PDR engine 136 then creates aggregated personal data 140 and provides the aggregated personal data 140 to the data subject in response to the request, as a unified and uniform data report. In addition to the APD engine 122, the iEoP engine 130, and the PDR engine 136, the DPI service 120 can include or provide other data privacy integration services.

A work package engine 142 can be used to split requests into multiple work packages. As mentioned above, the DPI service 120 can send requests (e.g., work packages) to applications according to responder group configurations 144. To provide additional optimizations beyond use of responder groups and other approaches, an application capability determiner 146 can determine capability and availability of applications before protocol requests are sent to applications.

For example, the DPI service 120 can determine, based on different triggers (e.g., receipt of a ticket request, a periodic schedule) to use the application capability determiner 146 to determine capabilities of each application for participating in a data privacy integration protocol. For example, the work package engine 142 can send a work package to each application to gather information in order to determine application capability and availability. The work package can be a "ping" work package or can be an "empty" work package (e.g., a type of work package an application may expect to receive as part of participation in the protocol, but one with an empty object or task list. The application capability determiner 146 can evaluate application responses to the work package to determine capabilities of each application for participating in the data privacy integration protocol. If each application is capable of participating in the protocol, the DPI service 120 can determine to handle protocol requests (e.g., either current or upcoming requests). If one or more applications are not capable of participating in the protocol, the DPI service 120 can perform one or more corrective or informative actions, such as alerting an administrator or halting or delaying handling of protocol requests (e.g., until a later time when all applications may be ready and able to participate in the protocol). For example, the DPI service 120 may reject (e.g., not accept) new tickets if the DPI service 120 has determined that at least one responder cannot properly participate in a DPI protocol phase. The DPI service can send a rejection message to a requester that includes a status code that informs the requester to retry sending the ticket at a later time, e.g., due to temporary unavailability of one or more responders. In general, by determining capability of applications before expending significant resources on protocol requests, expending of unnecessary resources can be avoided, as described above. Further examples and variations of determining application capability and availability for participating in data privacy integration protocols (or other asynchronous protocols) are described below.

As used in the present disclosure, the term "computer" is intended to encompass any suitable processing device. For example, although FIG. 1 illustrates a single server 102, a single end-user client device 104, a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system or runtime environment, including Linux, UNIX, Windows, Mac OS®, Java™, Android™, iOS, BSD (Berkeley Software Distribution) or any other suitable operating system. According to one implementation, the server 102 may also include or be communicably coupled with an e-mail server, a Web server, a caching server, a streaming data server, and/or other suitable server.

Interfaces 150, 152, 153, and 154 are used by the server 102, the end-user client device 104, the landscape system 106, and the administrator client device 105, respectively, for communicating with other systems in a distributed environment—including within the system 100—connected to the network 108. Generally, the interfaces 150, 152, 153, and 154 each comprise logic encoded in software and/or hardware in a suitable combination and operable to communicate with the network 108. More specifically, the interfaces 150, 152, 153, and 154 may each comprise software supporting one or more communication protocols associated with communications such that the network 108 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example. Similarly, each landscape system 106 includes one or more processors 157. Each processor 157. Each processor 157 executes instructions and manipulates data to perform the operations of the respective landscape system 106.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP OO (Object Oriented), any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. Similarly, each landscape system 106 includes memory 159. The memory 159 may store various objects or data associated with the purposes of the landscape system 106.

The end-user client device 104 and the administrator client device 105 may each be any computing device operable to connect to or communicate in the network(s) 108 using a wireline or wireless connection. In general, each of the end-user client device 104 and the administrator client device 105 comprises an electronic computer device operable to receive, transmit, process, and store any appropriate data associated with the system 100 of FIG. 1. Each of the end-user client device 104 and the administrator client device 105 can include one or more client applications, including the client application 113 or an administrative application 133, respectively. A client application is any type of application that allows a client device to request and view content on the client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 160 or processor(s) 162. Each processor 160 or 162 included in the end-user client device 104 or the administrator client device 105 may be a central processing unit (CPU), an application specific integrated circuit (ASIC), a field-programmable gate array (FPGA), or another suitable component. Generally, each processor 160 or 162 included in the end-user client device 104 or the administrator client device 105 executes instructions and manipulates data to perform the operations of the end-user client device 104 or the administrator client device 105, respectively. Specifically, each processor 160 or 162 included in the end-user client device 104 or the administrator client device 105 executes the functionality required to send requests to the server 102 and to receive and process responses from the server 102.

Each of the end-user client device 104 and the administrator client device 105 is generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the client device itself, including digital data, visual information, or a GUI 163 or a GUI 164, respectively.

The GUI 163 and the GUI 164 each interface with at least a portion of the system 100 for any suitable purpose, including generating a visual representation of the client application 113 or the administrative application 133, respectively. In particular, the GUI 163 and the GUI 164 may each be used to view and navigate various Web pages. Generally, the GUI 163 and the GUI 164 each provide the user with an efficient and user-friendly presentation of business data provided by or communicated within the system. The GUI 163 and the GUI 164 may each comprise a plurality of customizable frames or views having interactive fields, pull-down lists, and buttons operated by the user. The GUI 163 and the GUI 164 each contemplate any suitable graphical user interface, such as a combination of a generic web browser, intelligent engine, and command line interface (CLI) that processes information and efficiently presents the results to the user visually.

Memory 174 and memory 176 respectively included in the end-user client device 104 or the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memory 174 and the memory 176 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 104 and administrative client devices 105 associated with, or external to, the system 100. Additionally, there may also be one or more additional client devices external to the illustrated portion of system 100 that are capable of interacting with the system 100 via the network(s) 108. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

FIGS. 2, 3, 4, 5, 6, and 7A-7C are swim diagrams illustrating various processes and examples. Some examples use an event bus whereas other examples use direct communication between a DPI service and landscape applications. Additionally, some examples use responder groups while other examples don't include responder groups. Each process described herein can be applied using different communication architectures and with or without use of responder groups.

Figure 2:
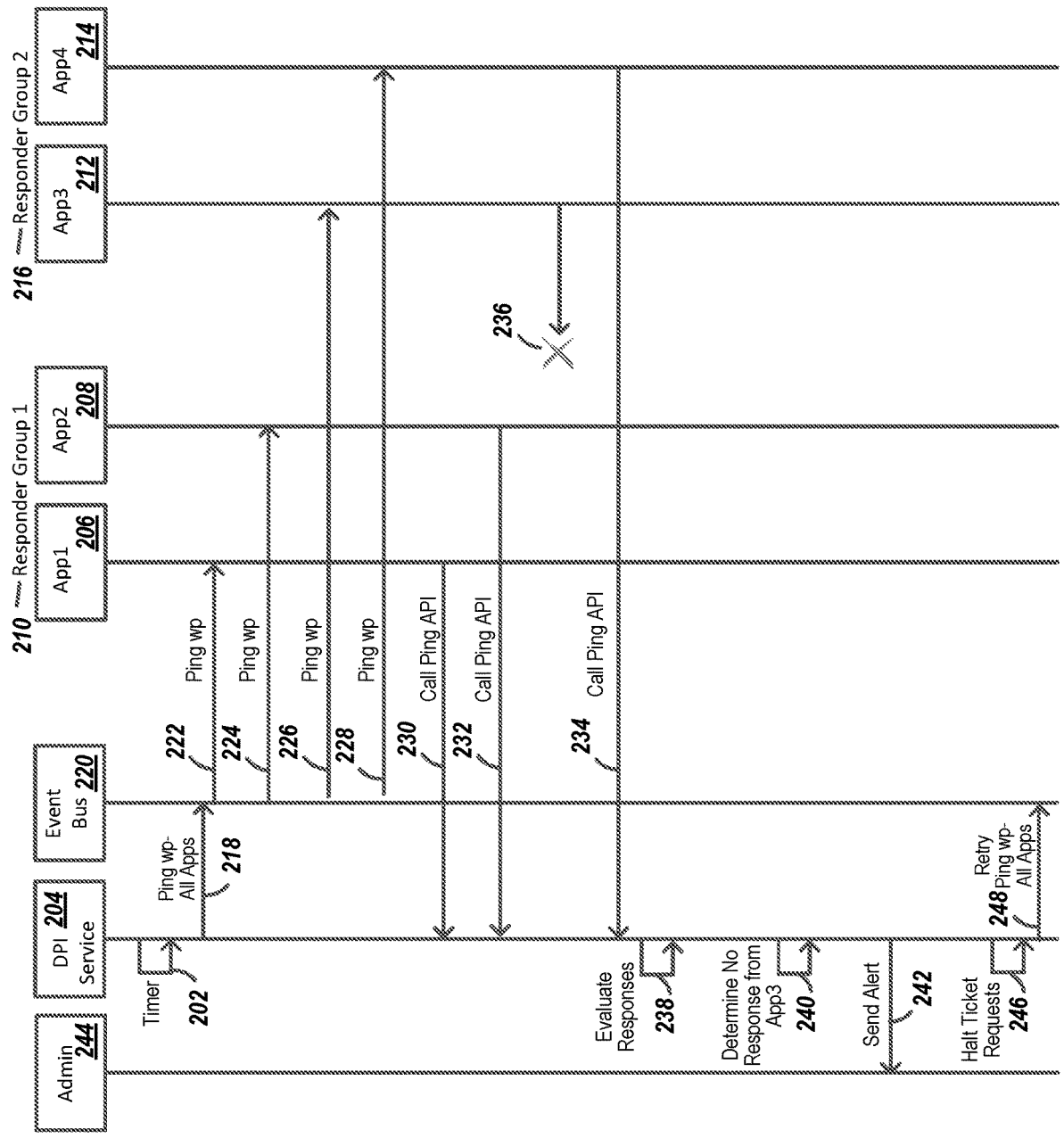
FIG. 2 is a swim lane diagram that illustrates use of an asynchronous ping work package.

FIG. 2 is a swim lane diagram 200 that illustrates use of an asynchronous ping work package. At 202, a DPI service 204 determines that a timer event has occurred that instructs the DPI service 204 to begin an asynchronous ping process for a multiple-application landscape that includes a first application 206 and a second application 208 in a first responder group 210 and a third application 212 and a fourth application 214 in a second responder group 216. A timer may be configured to generate a timer event on a periodic basis so that the DPI service can periodically initiate the asynchronous ping process, for example.

At 218, the DPI service 204 forwards a ping work package (wp) to an event bus 220 to instruct the event bus 220 to forward the ping work package to the first application 206, the second application 208, the third application 212, and the fourth application 214. Even though the applications are in different responder groups, the DPI service 204 can instruct the event bus 220 to forward the ping work package to all applications (although in some cases, the DPI service 204 could instruct sending of ping work packages on a responder-group basis). In some cases, ping-specific responder groups can be used that group responders differently than for check and block operations, for example. For instance, applications that have a higher probability of being offline may be put into earlier ping responder groups. At 222, 224, 226, and 228, the event bus 220 forwards the ping work package to the first application 206, the second application 208, the third application 212, and the fourth application 214, respectively.

The ping work package can be a request for a receiving application to retrieve and provide information to the DPI service 204. For example, each application can retrieve configuration information that indicates how the application is configured for a given data privacy integration protocol. For example, for the integrated end-of-purpose protocol, the configuration information for the application can indicate whether the application is configured as being relevant for (e.g., participating in) a blocking decision. In some implementations, ping work packages may be sub-process specific. For example, the ping work package may be configured by the DPI service 204 to request configuration information that relates to blocking capabilities of an application but not with regards to check capabilities. As another example, ping work packages may be specific for an object type or a subset of object types used in the system. As an example, the ping work package may be a request for applications to respond regarding whether they can handle a protocol request for specific object type(s). A given application may respond affirmatively that they can handle a protocol request for the specified object type(s) or may respond for at least some specified object type(s) that the application does not recognize the object type or is not configured to handle the object type for a specified protocol.

At 230, 232, and 234, the first application 206, the second application 208, and the fourth application 214 each respectively invoke a ping API of the DPI service 204 in response to receiving a respective ping work package. Requested configuration information can be included as parameters of the API calls, for example. The ping work package can have a unique identifier, and a respective application can include the unique identifier in the API call. As illustrated by a symbol 236, the third application 212 does not invoke an API of the DPI service 204. The third application 212 may be down, overloaded, misconfigured, or otherwise unable to respond to (and/or to receive) the ping work package. As another example, the sending of the ping work package to the third application 212 may have failed due to a network issue and the third application 212 may be actually configured correctly and online, but simply did not receive the ping work package.

At 238, the DPI service 204 evaluates responses to the ping work package (e.g., information provided in API calls) that have been sent by the applications in the landscape. The DPI service 204 can evaluate application responses to the work package to determine capabilities of the applications for participating in the data privacy integration protocol. Evaluating application responses can include determining whether each application has responded and whether each received response includes expected information. Additionally, the DPI service 204 can measure response times for those applications that have responded to the ping work packages. In some implementations, the responder can include a timestamp of when the responder received the work package, when sending feedback for the ping work package. Accordingly, the DPI service 204 can in some examples calculate different response time metrics, such as how long for a responder to ultimately send a response to the ping work package and how long to respond after receiving the work package. Additional examples of evaluation are provided below.

At 240, the DPI service 204 can determine, for example, that the third application 212 has not responded to the ping work package within a predetermined time window after the ping work package was sent. The DPI service 204 can determine that the third application 212 is currently not capable of participating in the data privacy integration protocol. In response to determining that the third application 212 is not currently capable of participating in the data privacy integration protocol, the DPI service 204 can initiate various types and number of (e.g., corrective) actions.

For example, at 242, the DPI service 204 sends an alert message to an administrator device 244 to alert an administrator regarding the unavailability of the third application 212. As another example, at 246, the DPI service 204 can halt (e.g., cancel) existing tickets and/or reject new ticket requests for the landscape for the data privacy integration protocol. In some cases, the DPI service 204 can halt existing ticket requests and reject new ticket requests only for requests for which the third application 212 was a potential relevant participant. For instance, if the third application 212 does not process a given object type, then ticket requests for object(s) of that object type may still be handled by the DPI service 204, even after determining an unavailability of the third application 212. In some cases, the DPI service 204 can still accept new ticket requests that have a flag, such as a no-optimization flag. For instance the ticket request may correspond to a right to be forgotten request, or may otherwise be a request where a requester desires to obtain as much information as currently possible and would want a request to still be processed even if a given application is non-responsive.

In some implementations, at 248, the DPI service 204 can re-try an asynchronous ping process by resending a ping work package (e.g., after a certain amount of time has passed), in response to not all applications responding to a previously-sent ping work package. A retry ping (or other type of) work package can be sent again to all applications or just to those application(s) that did not respond to the original ping work package.

Figure 3:
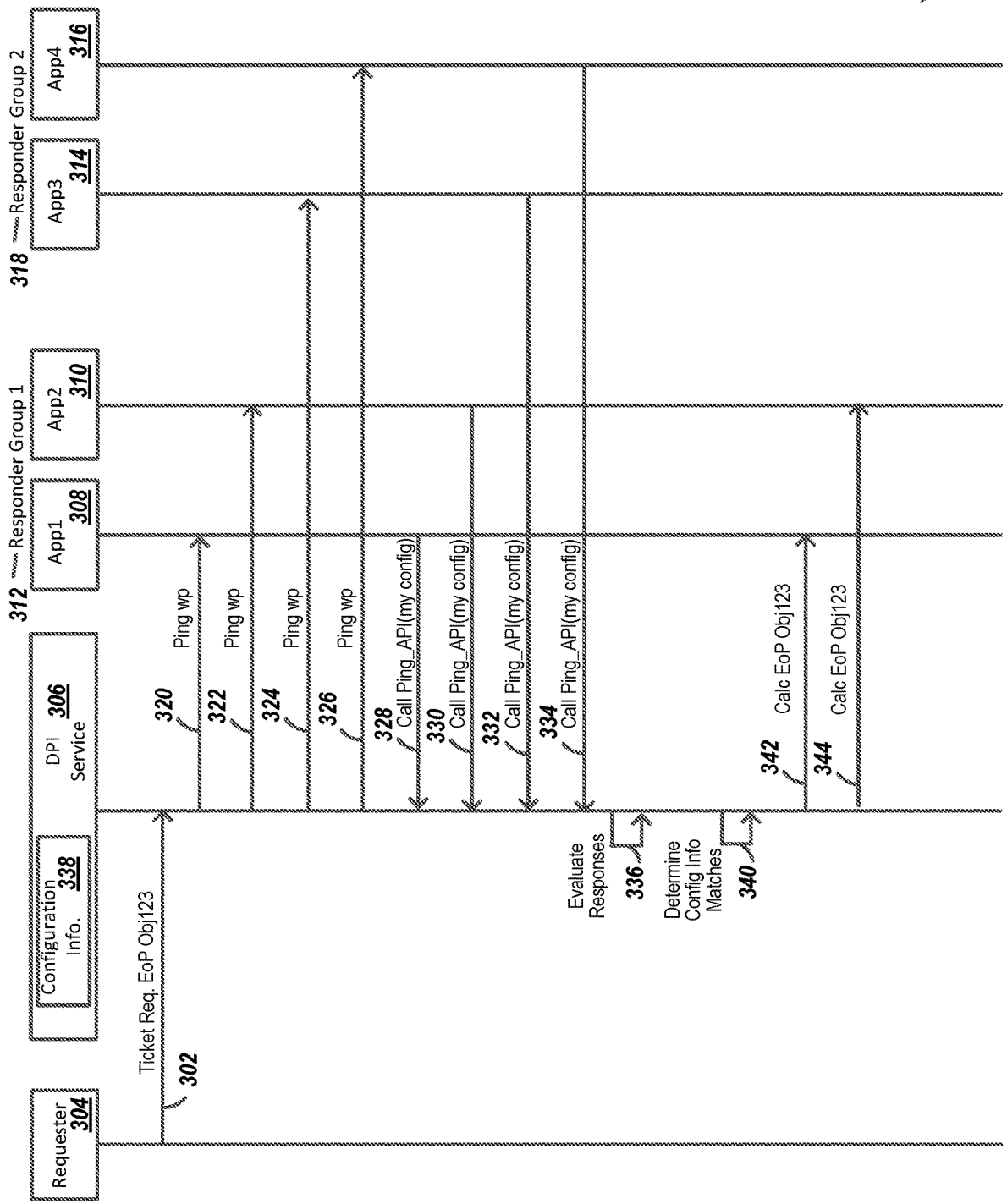
FIG. 3 is a swim lane diagram that illustrates sending a ping work package in response to a data privacy integration protocol request.

FIG. 3 is a swim lane diagram 300 that illustrates sending a ping work package in response to a data privacy integration protocol request. At 302, a requester 304 sends a ticket request for an integrated end-of-purpose protocol for an object with object identifier "Obj123" to a DPI service 306. The DPI service 306 can determine to send a ping work package to landscape applications, before processing the ticket request, to determine capabilities of the landscape applications for participating in the integrated end-of-purpose protocol. The landscape includes a first application 308 and a second application 310 in a first responder group 312 and a third application 314 and a fourth application 316 in a second responder group 318. In the example of FIG. 3, an event bus is not used and the DPI service 306 communicates directly with landscape applications.

For example, at 320, 322, 324, and 326, the DPI service 306 sends a ping work package to the first application 308, the second application 310, the third application 314, and the fourth application 316, respectively. The DPI service can determine that each of the first application 308, the second application 310, the third application 314, and the fourth application 316 are relevant to the received ticket request, for example. At 328, 330, 332, and 334, the first application 308, the second application 310, the third application 314, and the fourth application 316 each call a ping API of the DPI service 306, respectively, to provide application-specific configuration information to the DPI service 306.

At 336, the DPI service 306 evaluates the responses received from the landscape applications. For example, the DPI service 306 can compare, for each application that provided a response, configuration information provided by the application to configuration information for the application in known configuration information 338 stored by or accessible to the DPI service 306. At 340, the DPI service 306 determines that received configuration information matches known configuration information for each application. Accordingly, the DPI service 306 can determine to handle the ticket request received from the requester 304 (e.g., since each landscape application appears to be correctly configured for the integrated end-of-purpose protocol). For example, the DPI service 306 can request local end-of-purpose checks from landscape applications, in responder-group fashion. For instance, at 342 and 344, the DPI service 306 sends an end-of-purpose check request to the first application 308 and the second application 310 of the first responder group 312.

Figure 4:
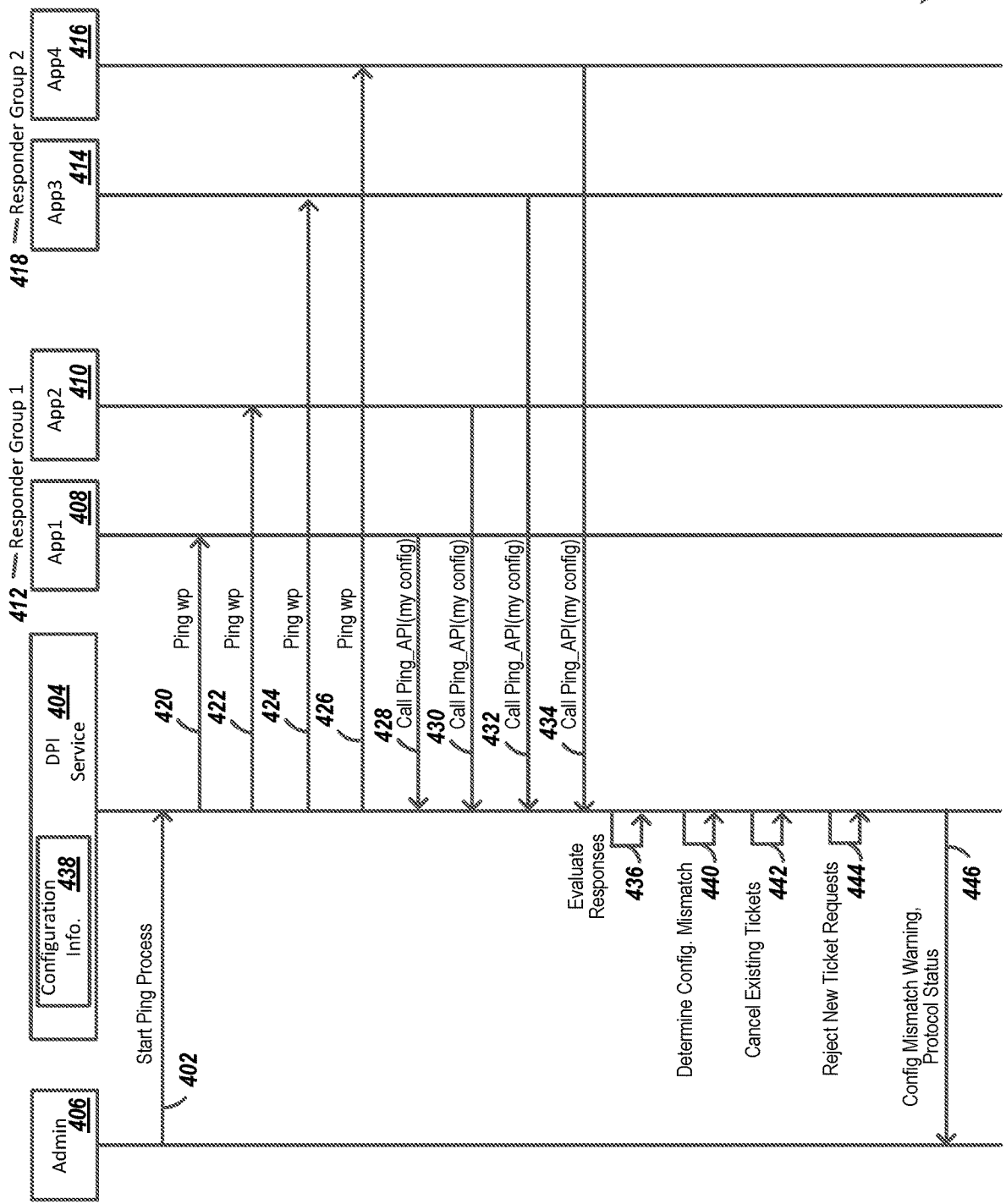
FIG. 4 is a swim lane diagram that illustrates sending a ping work package in response to an administrator request.

FIG. 4 is a swim lane diagram 400 that illustrates sending a ping work package in response to an administrator request. At 402, a DPI service 404 receives a request to start an asynchronous ping process from an administrator device 406. An administrator may wish to trigger the asynchronous ping process, for example.

The landscape includes a first application 408 and a second application 410 in a first responder group 412 and a third application 414 and a fourth application 416 in a second responder group 418. At 420, 422, 424, and 426, the DPI service 404 sends a ping work package to the first application 408, the second application 410, the third application 414, and the fourth application 416, respectively. At 428, 430, 432, and 434, the first application 408, the second application 410, the third application 414, and the fourth application 416 each call a ping API of the DPI service 404, respectively, to provide application-specific configuration information to the DPI service 404.

At 436, the DPI service 404 evaluates the responses received from the landscape applications. For example, the DPI service 404 can compare, for each application that provided a response, configuration information provided by the application to configuration information for the application in known configuration information 438 stored by or accessible to the DPI service 404. At 440, the DPI service 404 determines that received configuration information does not match known (e.g., expected) configuration information for at least one application. For example, configuration information received from the first application 408 might not match stored configuration information for the first application 408.

Accordingly, in response to the configuration mismatch, the DPI service 404 can perform one or more actions. For example, at 442, the DPI service 404 cancels handling of existing tickets (e.g., all tickets or tickets that just involve the first application 408). At 444, the DPI service 404 determines to enter a state in which new ticket requests (e.g., all ticket requests or ticket requests that just involve the first application 408) are rejected. At 446, the DPI service sends alert message(s) to the administrator device 406, that inform the administrator of the configuration mismatch and a status of the DPI service 404 with respect to protocol handling (e.g., whether tickets have been cancelled or whether new ticket requests are being accepted). In some cases, the DPI service 404 determines whether future or current tickets are affected by the configuration mismatch of the first application 408 and cancels or rejects only those tickets that are predicted to be affected by the configuration mismatch of the first application. In some cases, the DPI service 404 can determine, based on a degree, type, or severity of the configuration mismatch, whether past tickets involving the first application 408 should be reviewed by an administrator. In some cases, when an existing ticket is cancelled, the DPI service 404 sends out other work packages to some applications. For example, cancelling an existing ticket when some applications have already blocked an object may involve asking those applications to unblock the object.

Figure 5:
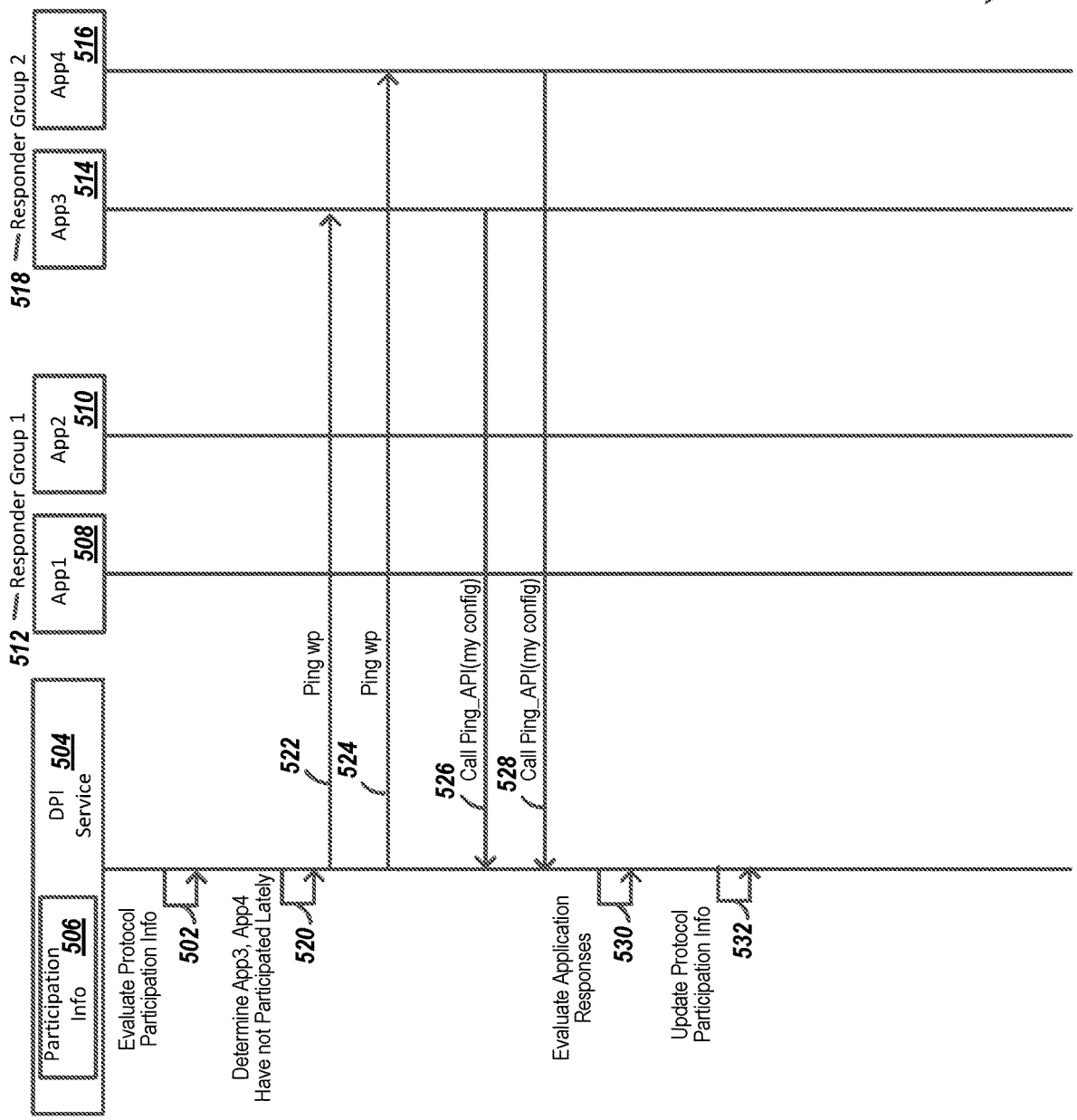
FIG. 5 is a swim lane diagram that illustrates sending a ping work package to applications that have not recently participated in a data privacy integration protocol.

FIG. 5 is a swim lane diagram 500 that illustrates sending a ping work package to applications that have not recently participated in a data privacy integration protocol. At 502, a DPI service 504 evaluates participation information 506 that includes activity information for landscape applications related to participation in data privacy integration protocol (s) provided by the DPI service 504. The landscape includes a first application 508 and a second application 510 in a first responder group 512 and a third application 514 and a fourth application 516 in a second responder group 518.

At 520, the DPI service 504 determines that the third application 514 and the fourth application 516 have not participated in the data privacy integration protocol(s) for at least a threshold period of time. For instance, due to being in a later responder group, the third application 514 and the fourth application 516 may not receive protocol requests because an application in an earlier responder group (e.g., the first responder group 512) may have provided a veto vote for recent protocol requests. The DPI service 504 can determine to send a ping work package to the third application 514 and the fourth application 516 in response to the third application 514 and the fourth application 516 having not participated in the data privacy integration protocol(s) for at least the threshold period of time.

For example, at 522 and 524 the DPI service 504 sends a ping work package to the third application 514 and the fourth application 516, respectively. At 526 and 528, the third application 514 and the fourth application 516 each call a ping API of the DPI service 504, respectively, to provide application-specific configuration information to the DPI service 504. At 530, the DPI service 530 evaluates application responses received from the third application 514 and the fourth application 516. In this example, application-received information is as expected. At 532, the DPI service 504 updates the participation information 506 to indicate that the third application 514 and the fourth application 516 have responded to the ping work package. The DPI service 504 can also update stored configuration information for the third application 514 and the fourth application 516. Although the example of FIG. 5 shows all applications in the second responder group 518 receiving a ping work package, in some examples, some but not all applications in a given responder group may receive a ping work package due to inactivity or other criteria.

Figure 6:
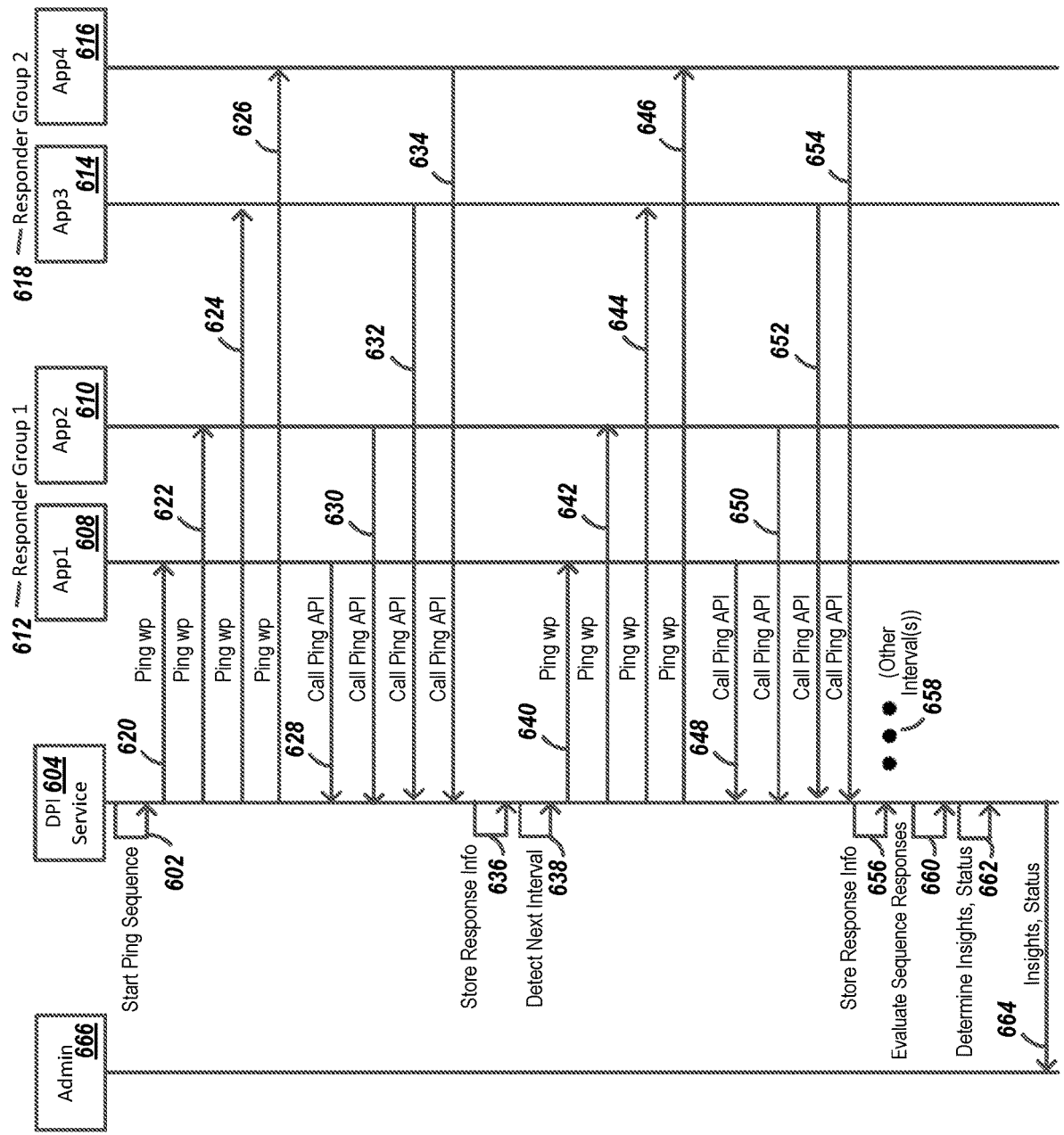
FIG. 6 is a swim lane diagram that illustrates sending a sequence of ping work packages to landscape applications.

FIG. 6 is a swim lane diagram 600 that illustrates sending a sequence of ping work packages to landscape applications. At 602, a DPI service 604 can determine to start an asynchronous ping process that includes sending a sequence of ping work packages to landscape applications. The landscape includes a first application 608 and a second application 610 in a first responder group 612 and a third application 614 and a fourth application 616 in a second responder group 618. The DPI service 604 can send a sequence of ping work packages to each landscape application, with an interval delay between each ping work package. For example, the sequence can include sending a ping work package to landscape applications every hour for the next 24 hours. The DPI service 604 can then determine aggregate information, trends, etc., from responses to the different ping work packages in the sequence.

For example, at 620, 622, 624, and 626, the DPI service 604 sends a ping work package to the first application 608, the second application 610, the third application 614, and the fourth application 616, respectively. At 628, 630, 632, and 634, the first application 608, the second application 610, the third application 614, and the fourth application 616 each call a ping API of the DPI service 604, respectively, to provide application-specific configuration information to the DPI service 604. At 636, the DPI service 604 can store and evaluate the received responses (and take any appropriate actions based on the received responses, as described herein).

At 638, the DPI service 604 determines that a next interval of the sequence has been reached. Accordingly, a next ping work package in the sequence can be sent to landscape applications. For instance, at 640, 642, 644, and 646, the DPI service 604 sends a ping work package to the first application 608, the second application 610, the third application 614, and the fourth application 616, respectively and at 648, 650, 652, and 654, the first application 608, the second application 610, the third application 614, and the fourth application 616 each call a ping API of the DPI service 604, respectively, to provide application-specific configuration information to the DPI service 604.

At 656, the DPI service 604 can store and evaluate the received responses and take any appropriate actions based on the received responses for the current interval. As indicated by symbols 658, the DPI service 604 can handle other intervals that include a sending of a ping work package and receiving and storing application responses. At 660, after the sequence has concluded, the DPI service 604 can evaluate the responses received for the entire sequence, such as to determine aggregate statistics, such as average response time per application, consistency of configuration information over the sequence, and other aggregate information. At 662, the DPI service 604 can do further analysis to determine insights, such as determining trends (e.g., a slowing of an application response time, or determining a difference in application response time during certain time periods (e.g. during certain times of day and/or certain days of week). At 664, the DPI service 604 can provide information determined during the sequence (e.g., insights, aggregate statistics, overall application or protocol status) to an administrator device 666. An administrator may configure the system based on the information sent to the administrator device 666, for example.

In some cases, the responses by the applications during the processing of the sequence can include further information, for example the application's resources usage at the time of the ping work package (e.g., CPU (Central Processing Unit) usage). The DPI service 604 can use such information, for example, to determine best time(s) to send a work package to an application (e.g., during the daytime, during the nighttime, on the weekend, etc.). In some cases, the DPI service 604 can auto-assign the respective responders into a certain responder group for ping work packages or otherwise mark applications for certain scheduling. For example, some applications might have a higher CPU usage on Sundays and a lower CPU usage on Wednesdays (e.g., in an e-commerce system). Other applications might have a higher CPU usage at the end of the month (e.g., a payroll system). The DPI service 604 can use predicted application workload information to group responders accordingly into responder groups. The DPI service 604 can also use application workload information to send ping work packages to a responder group during a time in which applications in the group are predicted to have less regular processing to handle.

Figure 7A:
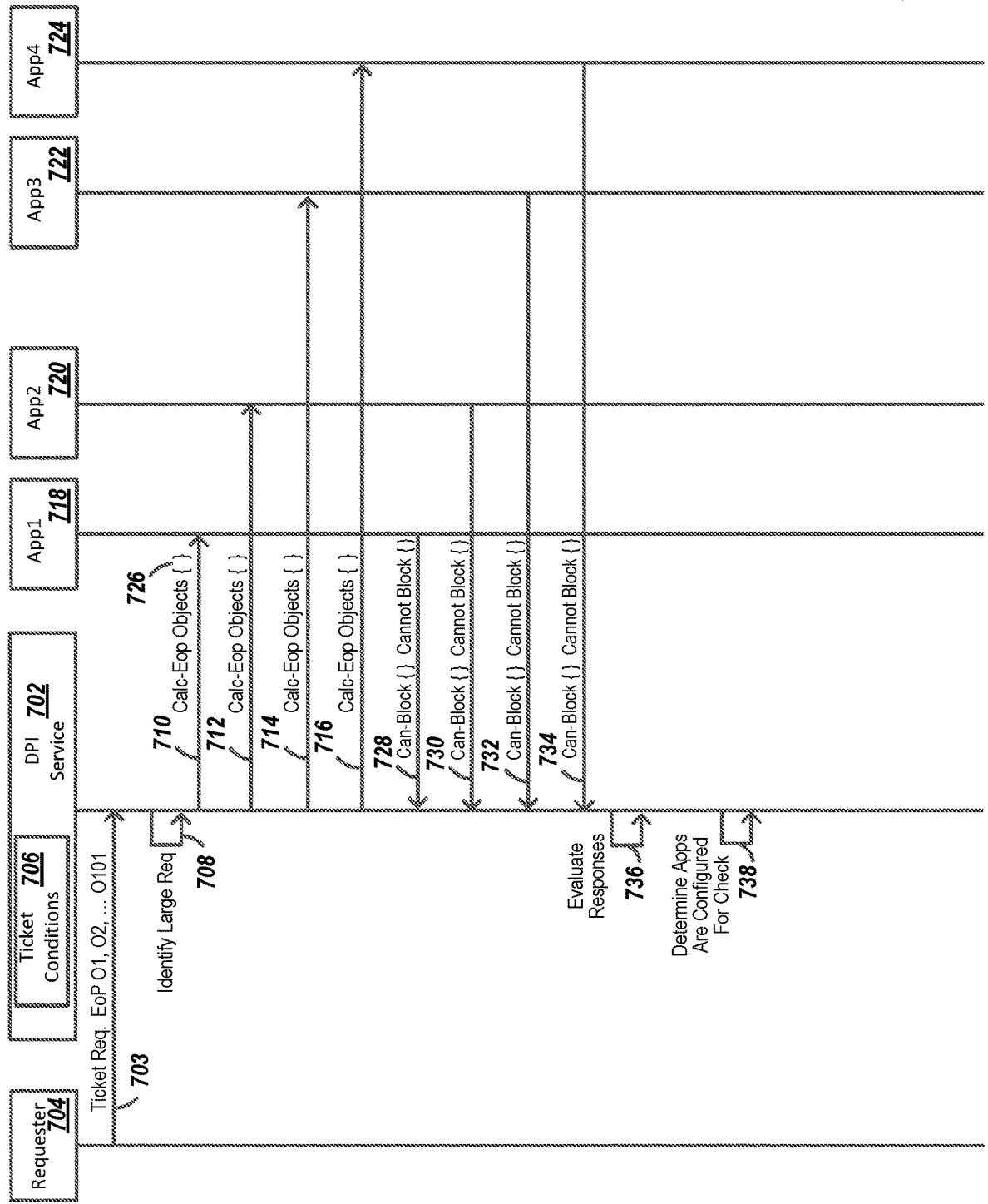
FIGS. 7A-7C illustrate a swim lane diagram that depicts determining application status by sending empty work packages.
Figure 7B:
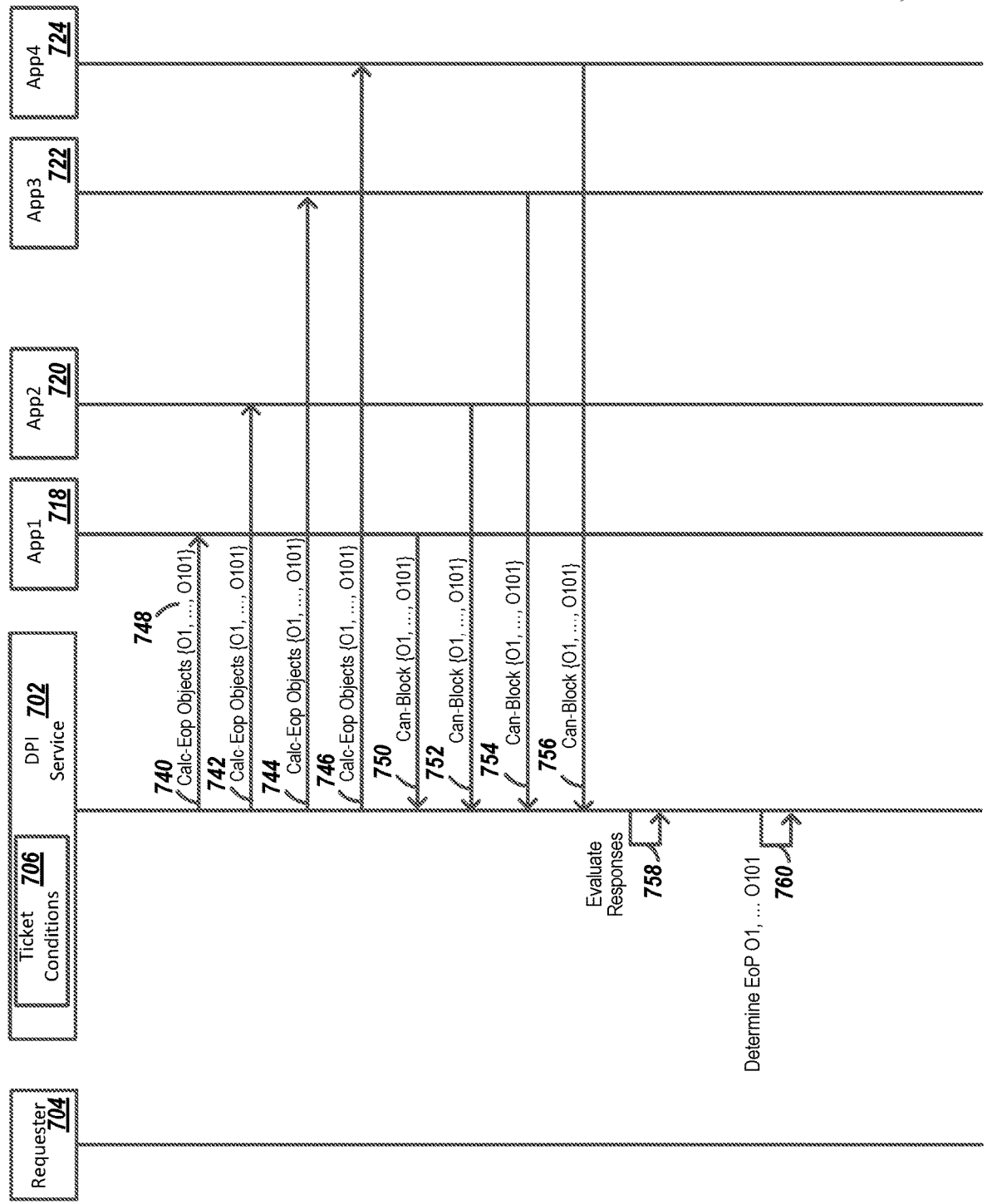
Figure 7C:
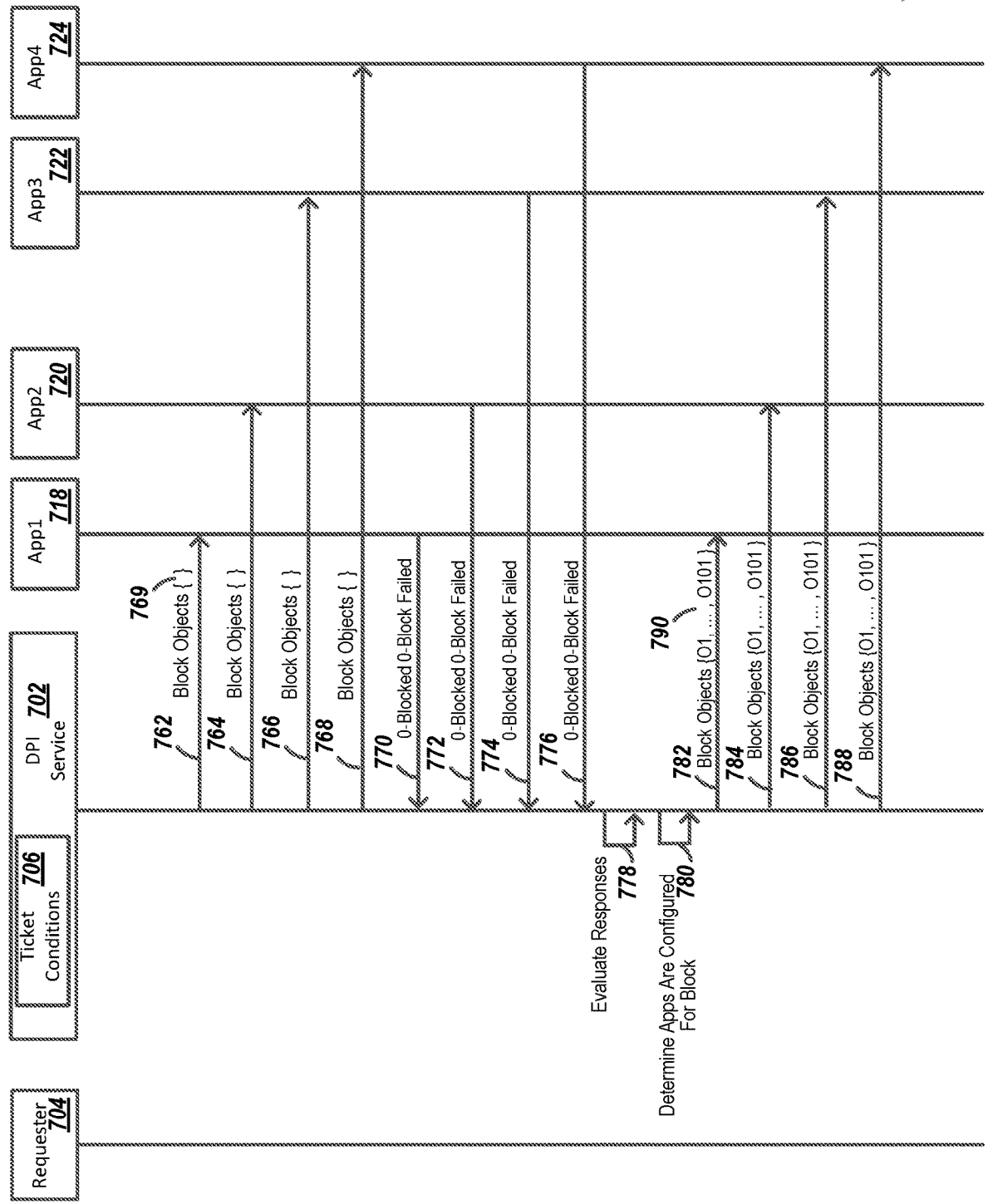

FIGS. 7A-7C illustrate a swim lane diagram 700 that depicts determining application status by sending empty work packages. As described above, a DPI service 702 can send a ping work package, to determine application capability. Applications can be configured to receive, recognize, and respond to the ping work package. Applications that had not previously been configured to accept and respond to a ping work package type can be programmed to accept and respond to ping work packages. As another approach, the DPI service can send an "empty" work package that is of a type that applications are already configured to accept and respond to based on already participating in a data privacy integration protocol. For example, applications may already be configured to respond to integrated end-of-purpose, aligned purpose disassociation, and/or integrated personal data retrieval protocol messages. An "empty" work package can be a work package for one of those protocols that includes an empty object list or empty task list, for example. For instance, a check work package can be part of the integrated end-of-purpose protocol that requests an application to perform a local end of purpose check for a list of objects. An empty work package in this example is a check work package for which the list of objects is empty. When sent to a landscape application, the application can still be expected to receive, process, and send a response to the empty work package. Accordingly, determining whether applications have successfully received and responded to empty work packages can be another approach for determining whether landscape applications are available and configured for a given data privacy integration protocol. Different examples of empty work packages are described below.

In the example of FIG. 7, at 703, the DPI service 702 receives a ticket request from a requester 704. The ticket request is for an end-of-purpose check for a list of 101 objects (e.g., with object identifiers O1, O2, . . . , O101). The DPI service 702 can be configured to send an empty work package to determine capabilities of landscape applications before processing any ticket request or in response to fulfilment of a ticket condition specified in ticket conditions 706. For example, the ticket conditions 706 can include a condition that specifies that an empty work package is to be sent to determine capabilities of landscape applications before processing a ticket that has at least a threshold number (e.g., 100) of objects (e.g., a "large" request). For instance, at 708, the DPI service 702 can determine that the received ticket request is a large request. Accordingly, at 710, 712, 714, and 716, the DPI service 702 sends a check work package with an empty object list to each of a first application 718, a second application 720, a third application 722, and a fourth application 724. In this example, the applications are not configured in responder groups, but empty work packages can also be sent to applications that are grouped by responder groups. As an example, an empty object list 726 is included in a check work package sent to the first application 718.

Each application can process and respond to the empty work package, if the application is available and configured to accept and process work packages of the type of the empty work package. Each application can respond to a received empty work package by calling an API of the DPI service 702. For example, at 728, 730, 732, and 734, the first application 718, the second application 720, the third application 722, and the fourth application 724 each call an API of the DPI service 702. Each invocation includes parameters that can include a "can-block" list that includes zero objects and a "cannot-block" list that includes zero objects.

At 736, the DPI service 702 evaluates responses to the empty check work package. At 738, the DPI service 702 determines that all applications have responded to the empty check work package as expected. Accordingly, the DPI service 702 can determine to proceed to handling the ticket request received from the requester 704.

For example and as shown in FIG. 7B, at 740, 742, 744, and 746, the DPI service 702 sends a check work package corresponding to the request sent by the requester 704 to the first application 718, the second application 720, the third application 722, and the fourth application 724, respectively. As illustrated by an object list 748, each check work package requests performing a check for the objects with object identifiers of O1, O2, . . . , O101. Although not shown in this example, the ticket request can be broken into multiple work packages that each include a subset of the 101 objects. Each application can perform a local end-of-purpose check for each of the 101 objects. At 750, 752, 754, and 756, the first application 718, the second application 720, the third application 722, and the fourth application 724 each invoke an API of the DPI service 702, respectively, to respond to the check work package that includes 101 objects. For example, each invocation can specify that a respective application is able to block each of the 101 objects. Accordingly, at 758, the DPI service 702 evaluates the received responses. At 760, the DPI service 702 determines that a consensus end-of-purpose has been reached in the landscape for each of the 101 objects.

Referring now to FIG. 7C, the DPI service 702 can proceed to a blocking phase of the integrated end-of-purpose protocol. Before requesting applications to block the 101 objects, the DPI service 702 can be configured to first check block capabilities of the applications by sending an empty block work package. For example, at 762, 764, 766, and 768, the DPI service 702 sends an empty block work package to the first application 718, the second application 720, the third application 722, and the fourth application 724, respectively. As an example, an empty block work package sent to the first application 718 includes an empty object list 769.

Each application can process and respond to the empty work block package if the application is available and configured to accept and process block work packages. For example, each application can respond to a received empty block work package by calling an API of the DPI service 702. For example, at 770, 772, 774, and 776, the first application 718, the second application 720, the third application 722, and the fourth application 724 each call an API of the DPI service 702. Each invocation includes parameters that indicate that no objects were blocked and no objects had a block failure.

At 778, the DPI service 702 evaluates responses to the empty block work package. At 780, the DPI service 702 determines that all applications have responded to the empty block work package as expected. Accordingly, the DPI service 702 can determine to proceed to requesting all applications to block the objects specified in the ticket request received from the requester 704. For example, at 782, 784, 786, and 788, the DPI service 702 sends a block work package to the first application 718, the second application 720, the third application 722, and the fourth application 724, respectively, where each block work package specifies the 101 objects O1, O2, . . . , O101 (e.g., as illustrated by an example object list 790).

In summary, the example of FIGS. 7A-7C show the DPI service 702 obtaining, at different points in time of a data privacy integration protocol, capabilities of applications that are specific to different stages of the protocol. If an application responds indicating an unexpected unavailability or misconfiguration, the DPI service 702 can preemptively determine to not proceed with the protocol at the current time, thus saving resources that may have otherwise been needlessly expended. The empty work package approach has advantages in that applications do not need to be configured to handle an additional (e.g., ping) work package. Although empty check and empty block work packages for the integrated end-of-purpose protocol are included in this example, an empty work package approach can be used for other work package types in the integrated end-of-purpose or other data privacy integration protocols.

Although the example in FIGS. 7A-7C shows empty check and empty block work packages being sent before sending non-empty check and block work packages, respectively, other arrangements are possible. For example, both an empty block work package and an empty check work package can be sent before the sending of the non-empty check work package. If evaluation of empty block work packages indicate that one or more applications are not able to handle block work packages, then the DPI service 702 can determine to not send the non-empty check work package (since even if all applications are able to perform the check, not all applications are able to block). In some cases, the empty block work package can be sent both before a sending of a non-empty check work package and a non-empty block work package, to introduce multiple time points for checking applications' ability to handle block work packages, before non-empty block work packages are sent.

Figure 8:
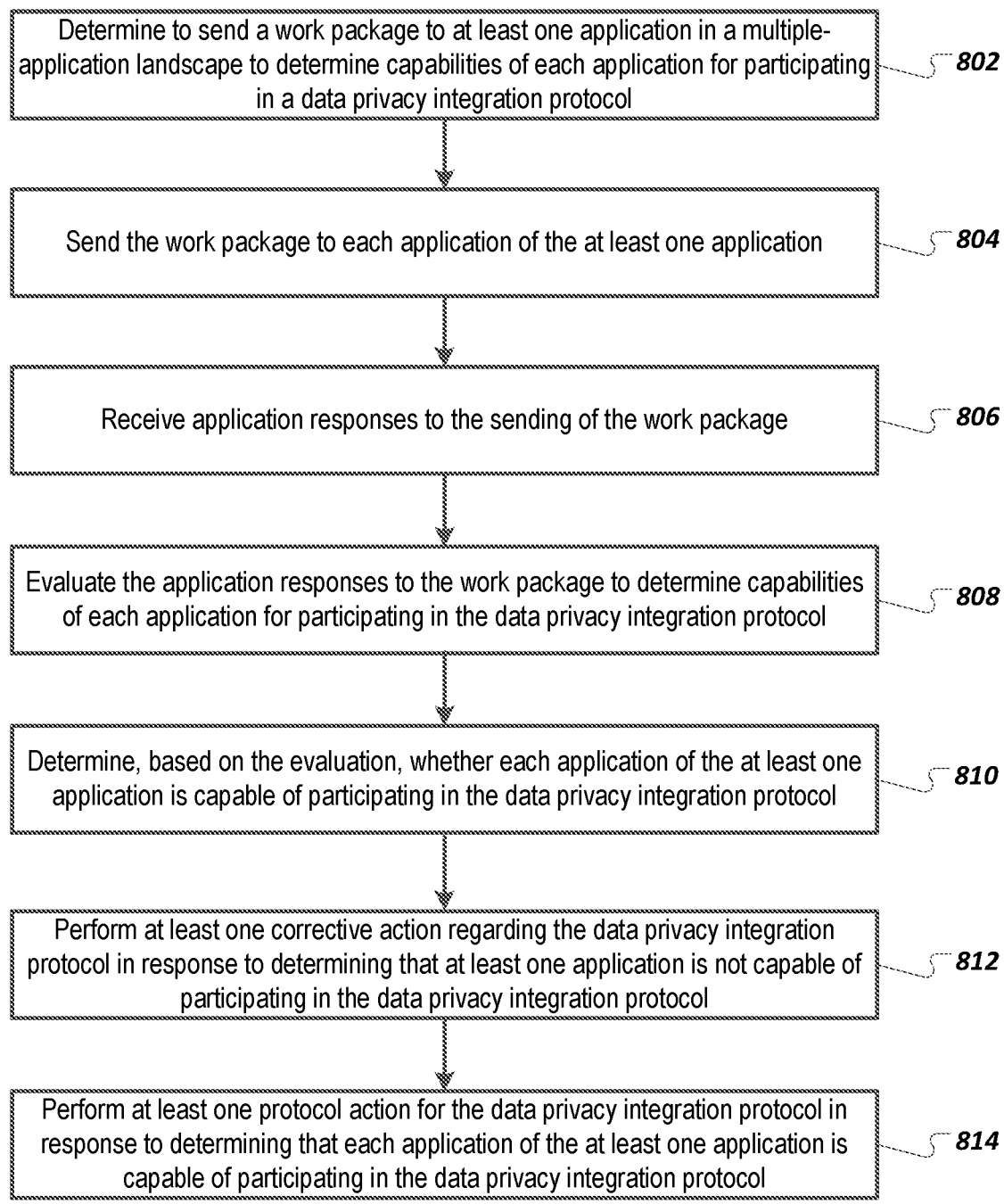
FIG. 8 is a flowchart of an example method for using asynchronous ping messages for determining capability of systems for executing asynchronous protocols.

FIG. 8 is a flowchart of an example method for using asynchronous ping messages for determining capability of systems for executing asynchronous protocols. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the server 102 of FIG. 1.

At 802, a determination is made to send a work package to at least one application in a multiple-application landscape to determine capabilities of each application for participating in a data privacy integration protocol. The data privacy integration protocol can an integrated end of purpose protocol, an aligned purpose disassociation protocol, or an integrated personal data retrieval protocol. Although data privacy integration protocols are described, work packages can be used to determine capabilities of applications with respect to other types of protocols.

A determination can be made to send the work package based on a periodic schedule or receiving a command from an administrator. Determining to send the work package to the at least one application can include determining that each application of the at least one application has not participated in the data privacy integration protocol for at least a threshold period of time and determining to send the work package to those applications. As another example, determining to send the work package to the at least one application can include receiving a request for the data privacy integration protocol, determining that each application of the at least one application is relevant to the request, and determining to send the work package to the at least one application to determine capabilities of each application before processing the request.

The work package can be an asynchronous ping work package that is of a different work package type than protocol-specific work packages that are specific to the data privacy integration protocol. As another example, the work package can be a protocol-specific work package that includes zero objects. For example, for the integrated end-of-purpose protocol, the work package can be a block instruction that includes an objects-to-block list that does not include any object identifiers.

At 804, the work package is sent to each application of the at least one application.

At 806, application responses to the sending of the work package are received. Application responses can correspond to application invocations of a data privacy integration service application programming interface. When the work package is a protocol-specific work package that includes zero objects, application responses can include status information for processing the protocol-specific work package that includes zero objects. For example, when the work package is a block instruction for the integrated end-of-purpose protocol, the application response can be that zero objects were blocked and zero objects had failed blocking. When the work package is an asynchronous ping work package, an application response can include configuration information that indicates how an application is configured for the data privacy integration protocol.

At 808, the application responses to the work package are evaluated to determine capabilities of each application for participating in the data privacy integration protocol. Evaluating the application responses can include determining that received configuration information for a first application does not match expected configuration information for the first application.

Evaluating application responses can include measuring application response times for responding to the work package. A determination can be made for each application as to whether the application responded to the work package within a predetermined amount of time. If an application does not respond within the predetermined period of time, a determination can be made that the application is not currently capable of participating in the data privacy integration protocol. A determination can also be made that an application response time has slowed in comparison to previous response time, or that certain applications tend to respond more slowly or not respond in time during time periods (e.g., certain times of day, certain days of week, or certain times during certain days of week).

At 810, a determination is made, based on the evaluation, regarding whether each application of the at least one application is capable of participating in the data privacy integration protocol.

At 812, at least one corrective action regarding the data privacy integration protocol is performed in response to determining that at least one application is not capable of participating in the data privacy integration protocol. For example, an administrator can be alerted regarding not all applications being capable of participating in the data privacy integration protocol. As another example, existing (e.g., in process) protocol requests can be cancelled and/or new requests can be rejected for the multiple-application landscape for the data privacy integration protocol.

At 814, at least one protocol action for the data privacy integration protocol is performed in response to determining that each application of the at least one application is capable of participating in the data privacy integration protocol. For example, a determination can be made to continue process existing requests or accepting new requests for the multiple-application landscape for the data privacy integration protocol. When the work package is sent in response to a particular request, a determination can be made to process that request.

Other features and aspects may be included in described processes and systems. For example, in addition to determining current availability, a DPI service may be configured to predict capability and act accordingly based on predictions. For instance, a situation might occur in which the DPI service knows that a certain application will be requested to work on a work package not immediately but after a certain amount of time. For example, a ticket might be created for which a responder might need to perform a local end of purpose check but not immediately. For example, the DPI service might know that the application is in a later responder group, and therefore the application might need to do the check later after other applications. Based on historic information (e.g., a ratio of objects in tickets that make it until the responder group of the application, a typical downtime length, etc.), a machine learning network or other data science engine can be trained to determine a likelihood that the application will be still offline or not available to work on the work package by the time the application is predicted to work on the work package. If the application is predicted to be available by a needed time, the DPI service can hold off halting processing of a ticket for example. Other examples include an administrator configuring predicted or typical downtime timeframes, per application, or the DPI service interfacing with another system to obtain application downtime information, such as a landscape control service that stores, per application, historic downtime information. Accordingly, the DPI service can use administrator-provided information and/or other system information, instead of or in addition to statistical information obtained and stored by the DPI service itself.

As another example of another feature, in some implementations, ping work packages may be extended with a payload, so that contextual messages between the DPI service and applications can be exchanged. For example, the DPI service can communicate a configuration change to an application. As another example, a ticket pause can be communicated to an application when another application is offline. Other types of information can be communicated between the DPI service and applications.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application Example 1. A computer-implemented method comprising:
determining to send a work package to at least one application in a multiple-application landscape to determine capabilities of each application for participating in a data privacy integration protocol;
sending the work package to each application of the at least one application;
receiving application responses to the sending of the work package;
evaluating the application responses to the work package to determine capabilities of each application for participating in the data privacy integration protocol;
determining, based on the evaluation, whether each application of the at least one application is capable of participating in the data privacy integration protocol;
in response to determining that at least one application is not capable of participating in the data privacy integration protocol, performing at least one corrective action regarding the data privacy integration protocol; and
in response to determining that each application of the at least one application is capable of participating in the data privacy integration protocol, performing at least one protocol action for the data privacy integration protocol.

Example 2. The computer-implemented method of Example 1, wherein the data privacy integration protocol is an integrated end of purpose protocol, an aligned purpose disassociation protocol, or an integrated personal data retrieval protocol.

Example 3. The computer-implemented method of Example 1, wherein determining to send the work package comprises determining to send the work package based on a periodic schedule or receiving a command from an administrator.

Example 4. The computer-implemented method of Example 1, wherein, determining to send the work package to the at least one application comprises determining that each application of the at least one application has not participated in the data privacy integration protocol for at least a threshold period of time.

Example 5. The computer-implemented method of Example 1, wherein determining to send the work package to the at least one application comprises:
 receiving a request for the data privacy integration protocol;
 determining that each application of the at least one application is relevant to the request; and
 determining to send the work package to the at least one application to determine capabilities of each application before processing the request.

Example 6. The computer-implemented method of Example 1, wherein the work package is an asynchronous ping work package that is of a different work package type than protocol-specific work packages that are specific to the data privacy integration protocol.

Example 7. The computer-implemented method of Example 1, wherein the work package is a protocol-specific work package that includes zero objects.

Example 8. The computer-implemented method of Example 7, wherein an application response comprises status information for processing the protocol-specific work package that includes zero objects.

Example 9. The computer-implemented method of Example 1, wherein each application response comprises an invocation of a data privacy integration service application programming interface.

Example 10. The computer-implemented method of Example 8, wherein an application response includes configuration information that indicates how an application is configured for the data privacy integration protocol.

Example 11. The computer-implemented method of Example 10, wherein evaluating application responses includes determining that received configuration information for a first application does not match expected configuration information for the first application.

Example 12. The computer-implemented method of Example 1, wherein evaluating application responses comprises measuring application response times for responding to the work package.

Example 13. The computer-implemented method of Example 1, wherein evaluating application responses comprises determining that a first application has not responded to the work package within a predetermined period of time.

Example 14. The computer-implemented method of Example 1, wherein performing at least one protocol action comprises continuing to process existing tickets or accepting new tickets for the multiple-application landscape for the data privacy integration protocol.

Example 15. The computer-implemented method of Example 1, wherein performing at least one corrective action comprises alerting an administrator regarding not all applications being capable of participating in the data privacy integration protocol.

Example 16. The computer-implemented method of Example 1, wherein performing at least one corrective action comprises cancelling existing requests or rejecting new requests for the multiple-application landscape for the data privacy integration protocol.

Example 17. A system comprising:
 one or more computers; and
 a computer-readable medium coupled to the one or more computers having instructions stored thereon which, when executed by the one or more computers, cause the one or more computers to perform operations comprising:
  determining to send a work package to at least one application in a multiple-application landscape to determine capabilities of each application for participating in a data privacy integration protocol;
  sending the work package to each application of the at least one application;
  receiving application responses to the sending of the work package;
  evaluating the application responses to the work package to determine capabilities of each application for participating in the data privacy integration protocol;
  determining, based on the evaluation, whether each application of the at least one application is capable of participating in the data privacy integration protocol;
  in response to determining that at least one application is not capable of participating in the data privacy integration protocol, performing at least one corrective action regarding the data privacy integration protocol; and
  in response to determining that each application of the at least one application is capable of participating in the data privacy integration protocol, performing at least one protocol action for the data privacy integration protocol.

Example 18. The system of Example 17, wherein the data privacy integration protocol is an integrated end of purpose protocol, an aligned purpose disassociation protocol, or an integrated personal data retrieval protocol.

Example 19. A non-transitory, computer-readable medium coupled to one or more processors and having instructions stored thereon which, when executed by the one or more processors, cause the one or more processors to perform operations, the operations comprising:
 determining to send a work package to at least one application in a multiple-application landscape to determine capabilities of each application for participating in a data privacy integration protocol;
 sending the work package to each application of the at least one application;
 receiving application responses to the sending of the work package;
 evaluating the application responses to the work package to determine capabilities of each application for participating in the data privacy integration protocol;
 determining, based on the evaluation, whether each application of the at least one application is capable of participating in the data privacy integration protocol;
 in response to determining that at least one application is not capable of participating in the data privacy integration protocol, performing at least one corrective action regarding the data privacy integration protocol; and
 in response to determining that each application of the at least one application is capable of participating in the data privacy integration protocol, performing at least one protocol action for the data privacy integration protocol.

Example 20. The computer-readable medium of Example 19, wherein the data privacy integration protocol is an integrated end of purpose protocol, an aligned purpose disassociation protocol, or an integrated personal data retrieval protocol.

What is claimed is:

1. A computer-implemented method comprising:
 determining to send a work package to at least one application in a multiple-application landscape to determine capabilities of each application for participating in a data privacy integration protocol;
sending the work package to each application of the at least one application;
receiving application responses to the sending of the work package;
evaluating the application responses to the work package to determine capabilities of each application for participating in the data privacy integration protocol;
determining, based on the evaluation, whether each application of the at least one application is capable of participating in the data privacy integration protocol;
in response to determining that at least one application is not capable of participating in the data privacy integration protocol, performing at least one corrective action regarding the data privacy integration protocol; and
in response to determining that each application of the at least one application is capable of participating in the data privacy integration protocol, performing at least one protocol action for the data privacy integration protocol.

2. The computer-implemented method of claim 1, wherein the data privacy integration protocol is an integrated end of purpose protocol, an aligned purpose disassociation protocol, or an integrated personal data retrieval protocol.

3. The computer-implemented method of claim 1, wherein determining to send the work package comprises determining to send the work package based on a periodic schedule or receiving a command from an administrator.

4. The computer-implemented method of claim 1, wherein, determining to send the work package to the at least one application comprises determining that each application of the at least one application has not participated in the data privacy integration protocol for at least a threshold period of time.

5. The computer-implemented method of claim 1, wherein determining to send the work package to the at least one application comprises:
receiving a request for the data privacy integration protocol;
determining that each application of the at least one application is relevant to the request; and
determining to send the work package to the at least one application to determine capabilities of each application before processing the request.

6. The computer-implemented method of claim 1, wherein the work package is an asynchronous ping work package that is of a different work package type than protocol-specific work packages that are specific to the data privacy integration protocol.

7. The computer-implemented method of claim 1, wherein the work package is a protocol-specific work package that includes zero objects.

8. The computer-implemented method of claim 7, wherein an application response comprises status information for processing the protocol-specific work package that includes zero objects.

9. The computer-implemented method of claim 8, wherein an application response includes configuration information that indicates how an application is configured for the data privacy integration protocol.

10. The computer-implemented method of claim 9, wherein evaluating application responses includes determining that received configuration information for a first application does not match expected configuration information for the first application.

11. The computer-implemented method of claim 1, wherein each application response comprises an invocation of a data privacy integration service application programming interface.

12. The computer-implemented method of claim 1, wherein evaluating application responses comprises measuring application response times for responding to the work package.

13. The computer-implemented method of claim 1, wherein evaluating application responses comprises determining that a first application has not responded to the work package within a predetermined period of time.

14. The computer-implemented method of claim 1, wherein performing at least one protocol action comprises continuing to process existing tickets or accepting new tickets for the multiple-application landscape for the data privacy integration protocol.

15. The computer-implemented method of claim 1, wherein performing at least one corrective action comprises alerting an administrator regarding not all applications being capable of participating in the data privacy integration protocol.

16. The computer-implemented method of claim 1, wherein performing at least one corrective action comprises cancelling existing requests or rejecting new requests for the multiple-application landscape for the data privacy integration protocol.

17. A system comprising:
one or more computers; and
a non-transitory, computer-readable medium coupled to the one or more computers having instructions stored thereon which, when executed by the one or more computers, cause the one or more computers to perform operations comprising:
determining to send a work package to at least one application in a multiple-application landscape to determine capabilities of each application for participating in a data privacy integration protocol;
sending the work package to each application of the at least one application;
receiving application responses to the sending of the work package;
evaluating the application responses to the work package to determine capabilities of each application for participating in the data privacy integration protocol;
determining, based on the evaluation, whether each application of the at least one application is capable of participating in the data privacy integration protocol;
in response to determining that at least one application is not capable of participating in the data privacy integration protocol, performing at least one corrective action regarding the data privacy integration protocol; and
in response to determining that each application of the at least one application is capable of participating in the data privacy integration protocol, performing at least one protocol action for the data privacy integration protocol.

18. The system of claim 17, wherein the data privacy integration protocol is an integrated end of purpose protocol, an aligned purpose disassociation protocol, or an integrated personal data retrieval protocol.

19. A non-transitory, computer-readable medium coupled to one or more processors and having instructions stored thereon which, when executed by the one or more processors, cause the one or more processors to perform operations, the operations comprising:
- determining to send a work package to at least one application in a multiple-application landscape to determine capabilities of each application for participating in a data privacy integration protocol;
- sending the work package to each application of the at least one application;
- receiving application responses to the sending of the work package;
- evaluating the application responses to the work package to determine capabilities of each application for participating in the data privacy integration protocol;
- determining, based on the evaluation, whether each application of the at least one application is capable of participating in the data privacy integration protocol;
- in response to determining that at least one application is not capable of participating in the data privacy integration protocol, performing at least one corrective action regarding the data privacy integration protocol; and
- in response to determining that each application of the at least one application is capable of participating in the data privacy integration protocol, performing at least one protocol action for the data privacy integration protocol.

20. The computer-readable medium of claim 19, wherein the data privacy integration protocol is an integrated end of purpose protocol, an aligned purpose disassociation protocol, or an integrated personal data retrieval protocol.

\* \* \* \* \*